US011031820B2

(12) United States Patent
Okamoto et al.

(10) Patent No.: US 11,031,820 B2
(45) Date of Patent: Jun. 8, 2021

(54) POWER TRANSMITTING DEVICE

(71) Applicant: PANASONIC CORPORATION, Osaka (JP)

(72) Inventors: Katsuya Okamoto, Fukuoka (JP); Souichi Kawata, Fukuoka (JP); Kazuhiro Eguchi, Fukuoka (JP); Ryosuke Hasaba, Kanagawa (JP); Yoshio Koyanagi, Kanagawa (JP); Tamaki Ura, Nagasaki (JP)

(73) Assignee: PANASONIC CORPORATION, Osaka (JP)

( * ) Notice: Subject to any disclaimer, the term of this patent is extended or adjusted under 35 U.S.C. 154(b) by 0 days.

(21) Appl. No.: 16/612,101

(22) PCT Filed: May 10, 2018

(86) PCT No.: PCT/JP2018/018229
§ 371 (c)(1),
(2) Date: Nov. 8, 2019

(87) PCT Pub. No.: WO2018/207899
PCT Pub. Date: Nov. 15, 2018

(65) Prior Publication Data
US 2020/0169117 A1 May 28, 2020

(30) Foreign Application Priority Data
May 10, 2017 (JP) .............................. JP2017-094100

(51) Int. Cl.
*H02J 50/12* (2016.01)
*H02J 50/50* (2016.01)
(Continued)

(52) U.S. Cl.
CPC .............. *H02J 50/12* (2016.02); *B60L 53/12* (2019.02); *B63G 8/00* (2013.01); *H01F 38/14* (2013.01);
(Continued)

(58) Field of Classification Search
CPC ...... H02J 7/00; H02J 7/02; H02J 7/025; H02J 50/12; H02J 50/10; H02J 50/80;
(Continued)

(56) References Cited

U.S. PATENT DOCUMENTS 9,577,462 B2 * 2/2017 Maekawa ............... H02J 5/005
10,549,652 B2 * 2/2020 Deguchi ................. B60L 53/31
(Continued)

FOREIGN PATENT DOCUMENTS

JP 2005-102101 A 4/2005
JP 2013-110805 A 6/2013
(Continued)

OTHER PUBLICATIONS

International Search Report, dated Jun. 26, 2018, in International Applicaation No. PCT/JP2018/018229 ( English Language Translation).

Primary Examiner — Nguyen Tran
Assistant Examiner — Jagdeep S Dhillon
(74) Attorney, Agent, or Firm — Greenblum & Bernstein, P.L.C.

(57) ABSTRACT

A power transmitting device transmits power to a power receiving device having a power receiving coil, in water. The power transmitting device includes one or more annular transmitting coils including a power transmitting coil configured to transmit the power to the power receiving coil via a magnetic field, a support member located in an inner space of the transmitting coil, which is formed by the annular transmitting coil, the support member including an outer
(Continued)

periphery along an inner periphery of the annular transmitting coil, and supporting the transmitting coil from the inner space, a power transmitting unit configured to supply A/C power to the power transmitting coil, and a capacitor connected to the transmitting coil, and forming a resonance circuit resonating together with the transmitting coil.

16 Claims, 51 Drawing Sheets

(51) Int. Cl.
  *B60L 53/12* (2019.01)
  *B63G 8/00* (2006.01)
  *H01F 38/14* (2006.01)
  *H02J 50/80* (2016.01)

(52) U.S. Cl.
  CPC ........... *H02J 50/50* (2016.02); *B60L 2200/32* (2013.01); *H02J 50/80* (2016.02)

(58) Field of Classification Search
  CPC .......... H02J 5/005; H01F 38/14; H01F 27/40; H01F 27/402; H01F 27/2804; H01F 27/2823; B60L 53/12
  USPC .... 307/104, 149, 9.1, 10.1, 10.2, 10.5, 10.3, 307/66
  See application file for complete search history.

(56) References Cited

U.S. PATENT DOCUMENTS

| | | | |
|---|---|---|---|
| 2005/0057422 A1 | 3/2005 | Deguchi et al. | |
| 2011/0076940 A1 | 3/2011 | Rhodes et al. | |
| 2014/0232200 A1* | 8/2014 | Maekawa | B63G 8/08 307/104 |
| 2014/0305927 A1* | 10/2014 | Alexander | A47J 41/0044 219/387 |
| 2015/0245723 A1* | 9/2015 | Alexander | F25B 21/04 99/483 |
| 2015/0294784 A1* | 10/2015 | Higashiyama | H02J 50/70 307/104 |
| 2017/0077759 A1* | 3/2017 | Niizuma | B60L 5/005 |
| 2018/0215277 A1 | 8/2018 | Deguchi et al. | |
| 2019/0229557 A1* | 7/2019 | Deguchi | H01F 38/14 |
| 2019/0334380 A1* | 10/2019 | Koyanagi | B63C 11/52 |

FOREIGN PATENT DOCUMENTS

| | | |
|---|---|---|
| JP | 2015-015901 A | 1/2015 |
| JP | 2015-231307 A | 12/2015 |
| JP | 2016-010229 A | 1/2016 |
| JP | 2017-028832 A | 2/2017 |
| JP | 2018-007400 A | 1/2018 |
| JP | 2018-074760 A | 5/2018 |
| WO | 2015/186697 A1 | 12/2015 |
| WO | 2017/013825 A1 | 1/2017 |
| WO | 2018/003568 A1 | 1/2018 |
| WO | 2018/079082 A1 | 5/2018 |

* cited by examiner

POWER TRANSMITTING DEVICE

TECHNICAL FIELD

The present disclosure relates to a power transmitting device which transmits power to a power receiving device having a power receiving coil.

BACKGROUND ART

In the related art, a technique is known in which an underwater base station serving as a power transmitting device transmits power to an underwater vehicle serving as a power receiving device in a contactless manner by using a magnetic resonance method (for example, refer to Patent Literature 1). The power transmitting device includes a power transmitting resonance coil, a balloon, and a balloon control mechanism. The power transmitting resonance coil transmits the power to a power receiving resonance coil of the power receiving device in a contactless manner by using a magnetic field resonance method. The balloon is internally provided with the power transmitting resonance coil. The balloon control mechanism removes water between the power transmitting resonance coil and the power receiving resonance coil by inflating the balloon when the power is transmitted.

In addition, an antenna device is known which transmits the power and data to an IC-installed medium by using an electromagnetic induction method using a frequency of 13.56 MHz band (for example, refer to Patent Literature 2). The antenna device is disclosed as follows. The antenna device has at least one fed loop antenna to which a signal current is fed and at least one parasitic loop antenna to which the signal current is not fed. The signal current is also generated in the parasitic loop antenna by using a magnetic field generated by the fed loop antenna. In this manner, a communication range of the fed loop antenna is widened.

CITATION LIST

Patent Literature

Patent Literature 1: JP-A-2015-015901
Patent Literature 2: JP-A-2015-102101

SUMMARY OF INVENTION

Technical Problem

When the power is transmitted by using the magnetic field resonance method, a plurality of annular power transmitting coils including at least the power transmitting resonance coil and the power receiving resonance coil are used. In a case where one or more annular power transmitting coils are sunk in water (for example, fresh water or seawater), a shape of each transmitting coil may be deformed due to a water flow. In this case, efficiency in forming a magnetic field generated by each transmitting coil decreases, and transmitting efficiency decreases during contactless power transmitting (wireless power supply) in which the power is transmitted via the magnetic field.

The present disclosure is made in view of the above-described circumstances, and provides a power transmitting device which can prevent deformation of an annular transmitting coil and can prevent a decrease in transmitting efficiency during contactless power transmitting in water.

Solution to Problem

According to the present disclosure, there is provided a power transmitting device which transmits power to a power receiving device having a power receiving coil, in water. The power transmitting device includes at least one or more annular transmitting coils including a power transmitting coil configured to transmit the power to the power receiving coil via a magnetic field, a support member located in an inner space of the transmitting coil, which is formed by the annular transmitting coil, the support member including an outer periphery along an inner periphery of the annular transmitting coil, and supporting the transmitting coil from the inner space, a power transmitting unit configured to supply A/C power to the power transmitting coil, and a capacitor connected to the transmitting coil, and forming a resonance circuit resonating together with the transmitting coil.

Advantageous Effects of Invention

According to the present disclosure, it is possible to prevent deformation of the annular transmitting coil, and it is possible to prevent a decrease in transmitting efficiency during contactless power transmitting in the water.

DESCRIPTION OF EMBODIMENTS

Hereinafter, embodiments will be described in detail with reference to the drawings as appropriate. However, unnecessarily detailed description may be omitted in some cases. For example, detailed description of well-known items and repeated description of substantially the same configurations may be omitted in some cases. The reason is to avoid the following description from becoming unnecessarily redundant and to facilitate understanding of those skilled in the art. The accompanying drawings and the following description are provided to enable those skilled in the art to fully understand the present disclosure, and these are not intended to limit the gist of the appended claims.

[Configuration]

Figure 1:
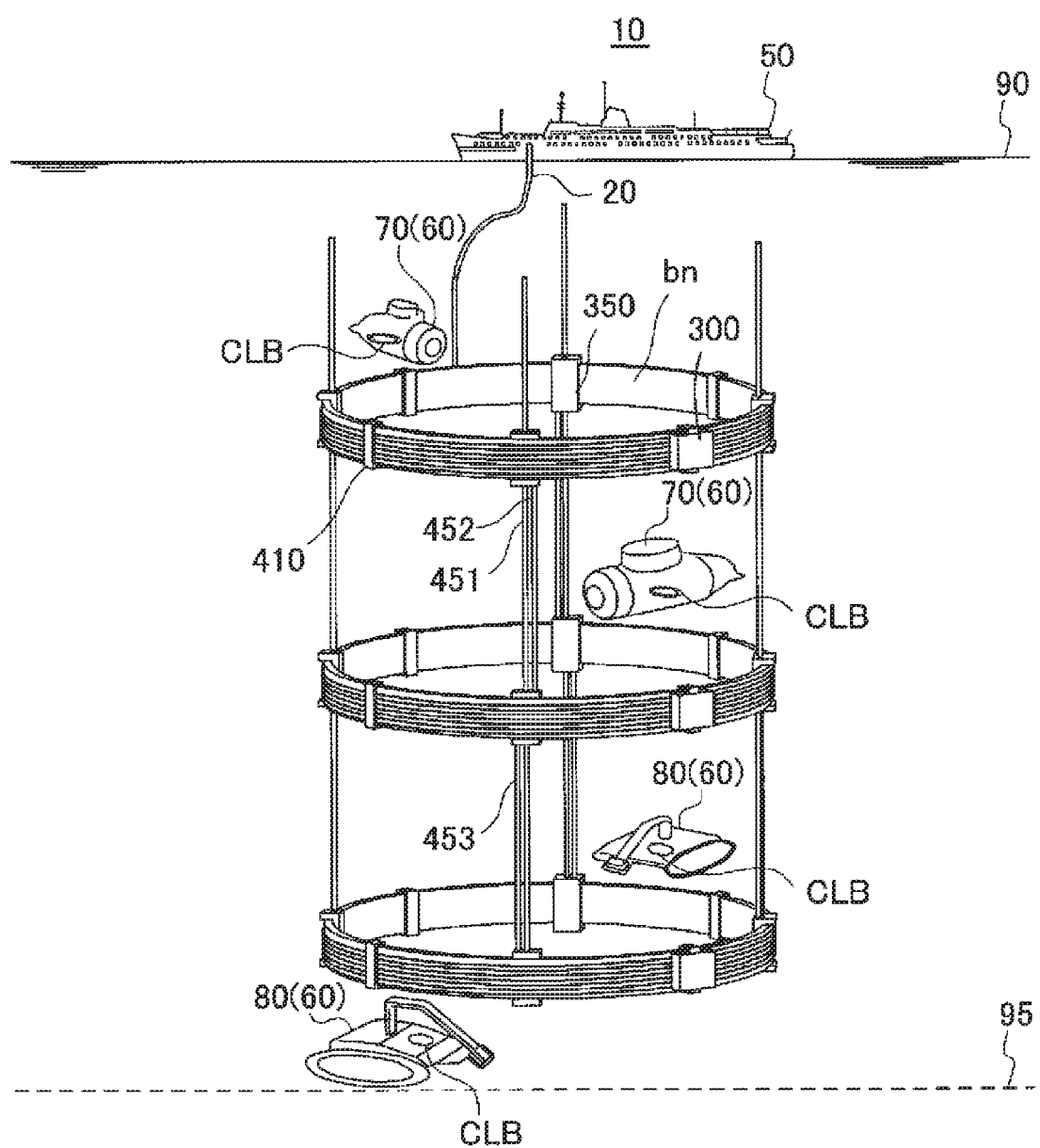
FIG. 1 is a schematic view illustrating an example of an environment where a power transmitting system according to an embodiment is placed.

FIG. 1 is a schematic view illustrating an example of an environment where a power transmitting system 10 according to an embodiment is placed. The power transmitting system 10 includes a power transmitting device 100, a power receiving device 200, and coils CL (refer to FIG. 2). The power transmitting device 100 transmits power to the power receiving device 200 via a plurality of the coils CL in a wireless (contactless) manner in accordance with a magnetic resonance method. The number of the coils CL to be arranged is n, and may be set to any desired number.

For example, the coil CL is formed in an annular shape, and is insulated by being covered with a resin cover. In addition, the coil CL may be formed of a cab tire cable, for example. The coil CL may be a helical coil or a spiral coil, for example. The helical coil is an annular coil helically wound (formed using helical winding) without using the same plane along a power transmitting direction (simply referred to as a "transmitting direction") based on a magnetic resonance method. The spiral coil is an annular coil wound (formed by spiral winding) in the same plane. According to the spiral coil, the coil CL can be thinned even in a case where a thickness of the coil CL is less likely to be secured. According to the helical coil, an internal space of the wound coil CL can be widely secured.

The coil CL includes a power transmitting coil CLA and a power receiving coil CLB. The power transmitting coil CLA is a primary coil, and the power receiving coil CLB is a secondary coil.

In addition, the coil CL may include one or more relay coils CLC (booster coil) located between the power transmitting coil CLA and the power receiving coil CLB. The relay coils CLC are arranged substantially in parallel, and opening surfaces formed by the relay coil CLC overlap each other more than half of the opening surfaces. For example, an interval between a plurality of the relay coils CLC is secured more than a radius of the relay coil CLC. The relay coil CLC assists the power transmitting performed by the power transmitting coil CLA.

The power transmitting coil CLA is disposed in the power transmitting device 100. The power receiving coil CLB is disposed in the power receiving device 200. The relay coil CLC may be disposed in the power transmitting device 100, may be disposed in the power receiving device 200, or may be disposed separately from the power transmitting device 100 and the power receiving device 200. A portion of the relay coil CLC may be disposed in the power transmitting device 100, and the other portion may be disposed in the power receiving device 200.

A portion of the power transmitting device 100 may be installed in a ship 50, or may be located in the other place. The power receiving device 200 may be installed in a movable underwater vehicle 60 (for example, a submarine 70 or an underwater excavator 80) or a fixedly installed power receiving device (for example, a seismometer, a surveillance camera, or a geothermal generator). Each coil CL is located in the water (for example, in the sea).

For example, the submarine 70 may include a remotely operated unmanned explorer (ROV), an unmanned underwater vehicle (UUV), or an autonomous underwater vehicle (AUV).

A part of the ship 50 exists above a water surface 90 (for example, a sea surface), that is, on the water, and the other part of the ship 50 exists below the water surface 90, that is, in the water. The ship 50 is movable on the water, and is freely movable on the water at a data acquisition place. The power transmitting device 100 of the ship 50 and the power transmitting coil CLA are connected to each other by a cable 20 (power cable). For example, the cable 20 is connected to a driver 151 (refer to FIG. 2) inside the power transmitting device 100 via a connector on the water.

The underwater vehicle 60 exists in the water or on a water bottom 95 (for example, a sea bottom), and travels in the water or on the water bottom 95. For example, the underwater vehicle 60 is freely movable to a data acquisition point in accordance with an instruction from the ship 50 on the water. The instructions from the ship 50 may be transmitted by communication via each coil CL, or may be transmitted by other communication methods.

The respective coils CL are arranged at an equal interval, for example. A distance between the coils CL adjacent to each other (coil interval) is 5 m, for example. For example, the coil interval is approximately half the diameter of the coil CL. In view of attenuation of magnetic field intensity in the water or in the sea, a transmitting frequency is 40 kHz or lower, for example. The transmitting frequency is preferably lower than 10 kHz. In addition, in a case where the power is transmitted at a transmitting frequency of 10 kHz or higher, it is necessary to perform a predetermined simulation, based on regulations of the Radio Law. In a case where the transmitting frequency is lower than 10 kHz, work for the predetermined simulation can be omitted. As the transmitting frequency is a lower frequency, a power transmitting distance is lengthened, the coil CL becomes larger, and the coil interval is lengthened. For example, when communication signals are superimposed on each other, the transmitting frequency may be a frequency higher than 40 kHz.

The transmitting frequency is determined, based on coil characteristics such as inductance of the coil CL, the diameter of the coil CL, and the number of winding times of the coil CL. For example, the diameter of the coil CL is several meters to several tens of meters. In addition, as the coil CL is thicker, that is, as a wire diameter of the coil CL is larger, electrical resistance decreases in the coil CL, and power loss decreases. In addition, for example, the power transmitted via the coil CL is, 50 W or higher, and may be in the kW order.

In addition, the power transmitting device 100 may include one or more bobbins bn, one or more relay boxes 300, and one or more spacers 350.

A material of the bobbin bn may be a non-conductive or non-magnetic material. For example, a resin such as polyvinyl chloride, acrylic, and polyester may be used. The material of the bobbin may be dielectric. For example, if the polyvinyl chloride is used as the material of the bobbin, the material is cheap, is easy to obtain, and is likely to be processed. Since the bobbin bn is non-conductive, the power transmitting device 100 can prevent the magnetic field generated by an alternating current flowing through the coil CL from being absorbed by the bobbin bn. In this manner, the power transmitting device 100 maintains strength of the magnetic field. Accordingly, the power transmitting device 100 can prevent a decrease in the transmitting efficiency when the power is transmitted through the magnetic field. Since the bobbin bn is non-magnetic, the power transmitting device 100 can prevent the current flowing through the coil CL from being transmitted to highly conductive water via the bobbin bn. Therefore, the power transmitting device 100 can maintain a magnitude of the current flowing through the coil CL, can maintain the strength of the magnetic field generated based on the current, and can prevent a decrease in the transmitting efficiency when the power is transmitted via the magnetic field.

The bobbin bn may be formed in a cylindrical shape, or may be formed in other shapes. The coil CL is wound around the outer periphery of the bobbin bn. Accordingly, the bobbin bn can prevent a portion of the coil CL from being deformed inward in the water, for example. Therefore, the bobbin bn can also prevent other portions of the coil CL from being deformed outward. Accordingly, the coil CL is caused to extend along the bobbin bn. In this manner, the coil CL is likely to be formed into a desired shape, and is less likely to be deformed.

In addition, the coil CL may be bent due to the weight of the coil CL itself. For example, if the weight of one coil CL is approximately 250 kg, when many coils CL (for example, the power transmitting coil CLA and one or more relay coils CLC) are connected to each other, the weight may be approximately 10 times. If the plurality of coils CL are connected to each other and are sunk in the water while being aligned in a water depth direction, the respective coils CL are likely to be deformed due to the weights. In contrast, the power transmitting device 100 can prevent deformation of the respective coils CL by using the bobbin bn.

In addition, a power transmitting distance can be lengthened as the diameter of the coil CL formed in an annular shape is larger. On the other hand, as the diameter of the coil CL is larger, a wire material of the coil CL increases, the coil CL becomes heavier, and the coil CL is likely to be bent. The reason is that a force of deforming the coil CL inward becomes stronger as the diameter of the coil CL is larger. Therefore, the power transmitting device 100 uses the bobbin bn. In this manner, while securing the power transmitting distance, the power transmitting device 100 can prevent a decrease in the power transmitting efficiency from being degraded which may be caused by the deformation of the coil CL.

The relay box 300 connects a starting end and a terminal of the coil CL to be wound in the outer periphery of the bobbin bn so that the annular coil CL can be formed. In addition, a resonance circuit is formed in the relay box 300 by the coil CL and a capacitor.

The spacer 350 may be attached so as to grip the bobbin bn at a predetermined number of locations (for example, four locations) of the inner periphery of the bobbin bn. The number of the spacers 350 may be determined, based on the diameter of the coil CL, for example. As the diameter of the coil CL is larger, may (for example, four or more) spacers may be provided. The spacer 350 may pinch and support the coil CL wound around the outer periphery of the bobbin bn.

The power transmitting device 100 may include a coil deployment rope 451 for deploying the respective coils CL, and coil connection ropes 452 and 453 for connecting the respective coils CL. The coil deployment rope 451 connects the coil CL located in a lowermost portion (deepest portion) to the coil CL located in an uppermost portion (shallowest portion) via the spacer 350. The coil connection ropes 452 and 453 connect the two coils CL adjacent to each other in the water depth direction (up-down direction) via the spacer 350.

The coil deployment rope 451 may extend to the deepest portion side, and a weight may be connected to the deepest portion side. Further, the coil deployment rope 451 may extend to the shallowest portion side, and a buoy may be connected to the shallowest portion side.

The power transmitting device 100 can use the weight to regulate the movement of the respective bobbins bn or the respective coils CL which are connected by the coil deployment rope 451. Accordingly, even if a water flow is generated in the water, the power transmitting device 100 can use the weight to regulate the movement of the respective coils CL, and can prevent a decrease in the power transmitting efficiency using the coil CL.

In addition, in the coil deployment rope 451, the weight is connected to an end portion on the deepest portion side, and the buoy is connected to an end portion on the shallowest portion side. In this manner, the weight is located on the water bottom side, and the buoy is located on the water surface side. Therefore, the coil deployment rope 451 can maintain a posture which is substantially perpendicular to the water surface 90. Accordingly, a surface defined by the respective coils CL is substantially parallel to the water surface 90, and the power can be transmitted in the water depth direction (direction substantially orthogonal to the water surface 90) by using the magnetic field resonance method.

Figure 2:
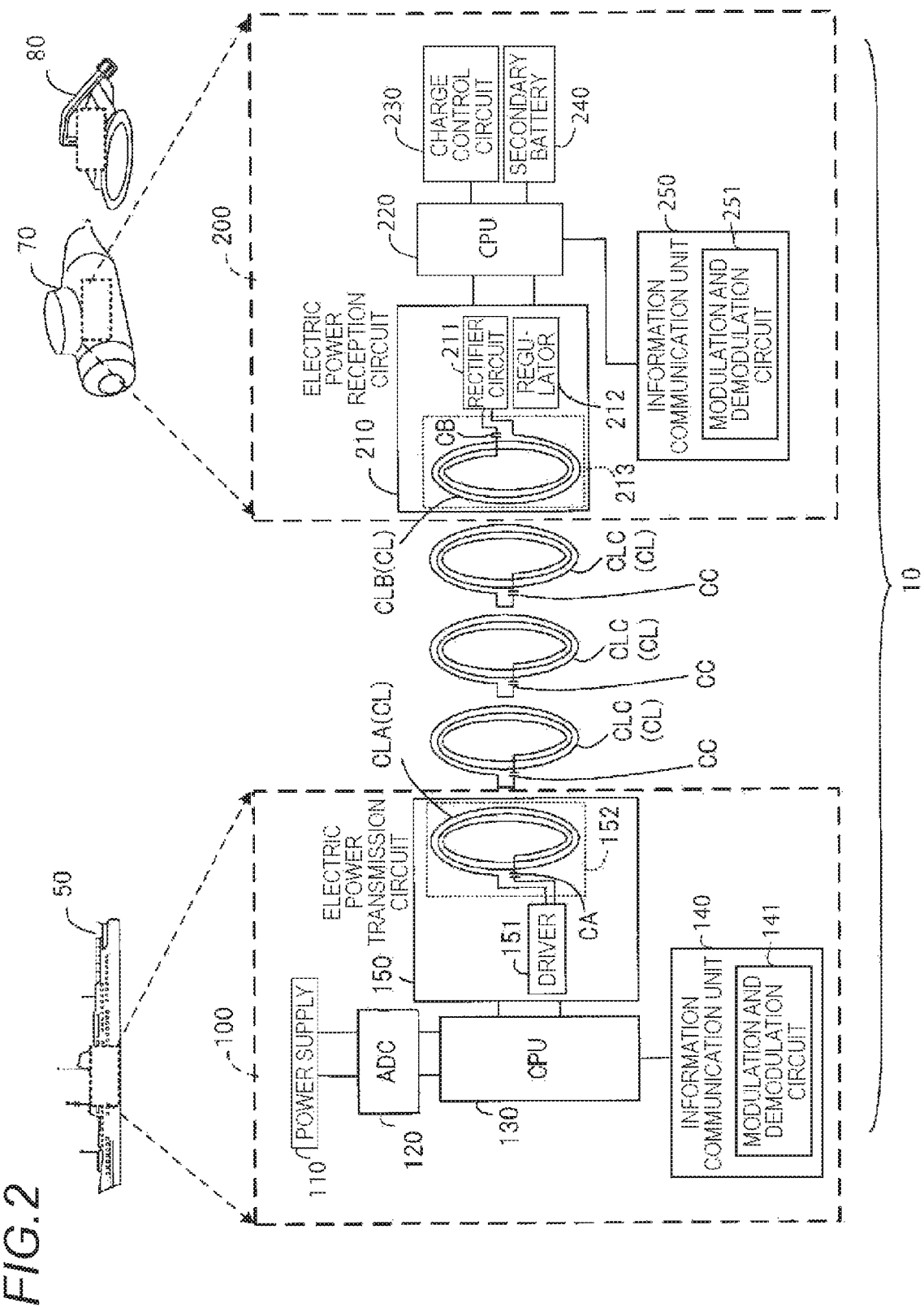
FIG. 2 is a block diagram illustrating a configuration example of the power transmitting system.

FIG. 2 is a block diagram illustrating a configuration example of the power transmitting system 10. The power transmitting system 10 includes the power transmitting device 100 and the power receiving device 200).

The power transmitting device 100 includes a power supply 110, an AC/DC converter (ADC) 120, a central processing unit (CPU) 130, an information communication unit 140, and a power transmitting circuit 150.

The ADC 120 converts A/C power supplied from the power supply 110 into D/C power. The converted D/C power is supplied to the power transmitting circuit 150.

The CPU 130 (example of a processor) comprehensively controls operations of the respective units (for example, the power supply 110, the ADC 120, the information communication unit 140, and the power transmitting circuit 150) of the power transmitting device 100.

The information communication unit 140 includes a modulation/demodulation circuit 141 for modulating or demodulating communication data obtained by communicating with the power receiving device 200. For example, the information communication unit 140 transmits control information received from the power transmitting device 100 to the power receiving device 200 via the coil CL. For example, the information communication unit 140 receives data transmitted to the power transmitting device 100 from the power receiving device 200 via the coil CL. For example, the data includes exploration result data obtained by the power receiving device 200 through underwater exploration or water bottom exploration. While the underwater vehicle 60 carries out work for collecting data, the information communication unit 140 can quickly perform data communication with the underwater vehicle 60.

The power transmitting circuit 150 includes a driver 151 and a resonance circuit 152. The driver 151 converts the DC power transmitted from the ADC 120 into an AC voltage (pulse waveform) having a predetermined frequency. The resonance circuit 152 is configured to include a capacitor CA and a power transmitting coil CLA, and generates the AC voltage having a sine waveform, from the AC voltage having the pulse waveform, which is converted by the driver 151. The power transmitting coil CLA resonates at a predetermined resonance frequency in accordance with the AC voltage applied from the driver 151. The power transmitting coil CLA is subjected to impedance matching with output impedance of the power transmitting device 100.

A predetermined frequency relating to the AC voltage converted by the driver 151 corresponds to a transmitting frequency of the power transmitting between the power transmitting device 100 and the power receiving device 200, and corresponds to a resonance frequency. The transmitting frequency may be set, based on a Q value of the respective coils CL, for example.

The power receiving device 200 includes a power receiving circuit 210, a CPU 220, a charge control circuit 230, a secondary battery 240, and an information communication unit 250.

The power receiving circuit 210 includes a rectifier circuit 211, a regulator 212, and a resonance circuit 213. The resonance circuit 213 is configured to include a capacitor CB and a power receiving coil CLB, and receives the A/C power transmitted from the power transmitting coil CLA. The power receiving coil CLB is subjected to impedance matching with input impedance of the power receiving device 200. The rectifier circuit 211 converts the A/C power induced in the power receiving coil CLB into the D/C power. The regulator 212 converts the DC voltage supplied from the rectifier circuit 211 into a predetermined voltage suitable for charging the secondary battery 240.

The CPU 220 (example of a processor) comprehensively controls operations of the respective units (for example, the power receiving circuit 210, the charge control circuit 230, the secondary battery 240, and the information communication unit 250) of the power receiving device 200.

The charge control circuit 230 controls charging to the secondary battery 240 in accordance with a type of the secondary battery 240. For example, in a case where the secondary battery 240 is a lithium ion battery, the charge control circuit 230 starts charging the secondary battery 240 with a constant voltage and by using the DC power supplied from the regulator 212.

The secondary battery 240 stores the power transmitted from the power transmitting device 100. The secondary battery 240 is a lithium ion battery, for example.

The information communication unit 250 includes a modulation/demodulation circuit 251 for modulating or demodulating communication data obtained by communicating with the power transmitting device 100. For example, the information communication unit 250 receives control information from the power transmitting device 100 transmitted to the power receiving device 200 via the coil CL. For example, the information communication unit 250 transmits data received from the power receiving device 200 to the power transmitting device 100 via the coil CL. For example, the data includes exploration result data obtained by the power receiving device 200 through underwater exploration or water bottom exploration. While the underwater vehicle 60 carries out work for collecting data, the information communication unit 250 can quickly perform data communication with the ship 50.

The relay coil CLC configures a resonance circuit together with a capacitor CC, similarly to the power transmitting coil CLA and the power receiving coil CLB. That is, according to the present embodiment, the power is transmitted using the magnetic resonance method by arranging the resonance circuits in multiple stages in the water.

Next, the power transmitting from the power transmitting device 100 to the power receiving device 200 will be described.

In the resonance circuit 152, if a current flows through the power transmitting coil CLA of the power transmitting device 100, a magnetic field is generated around the power transmitting coil CLA. The vibration of the generated magnetic field is transmitted to the resonance circuit including the relay coil CLC which resonates at the same frequency or the resonance circuit 213 including the power receiving coil CLB.

In the resonance circuit including the relay coil CLC, the current is excited in the relay coil CLC by the vibration of the magnetic field, current flows, and the magnetic field is further generated around the relay coil CLC. The vibration of the generated magnetic field is transmitted to the resonance circuit including the other relay coil CLC which resonates at the same frequency or the resonance circuit 213 including the power receiving coil CLB.

In the resonance circuit 213, the AC current is induced in the power receiving coil CLB by the vibration of the magnetic field of the relay coil CLC or the power transmitting coil CLA. The induced AC current is rectified, and is converted to a predetermined voltage, thereby charging the secondary battery 240.

Figure 3:
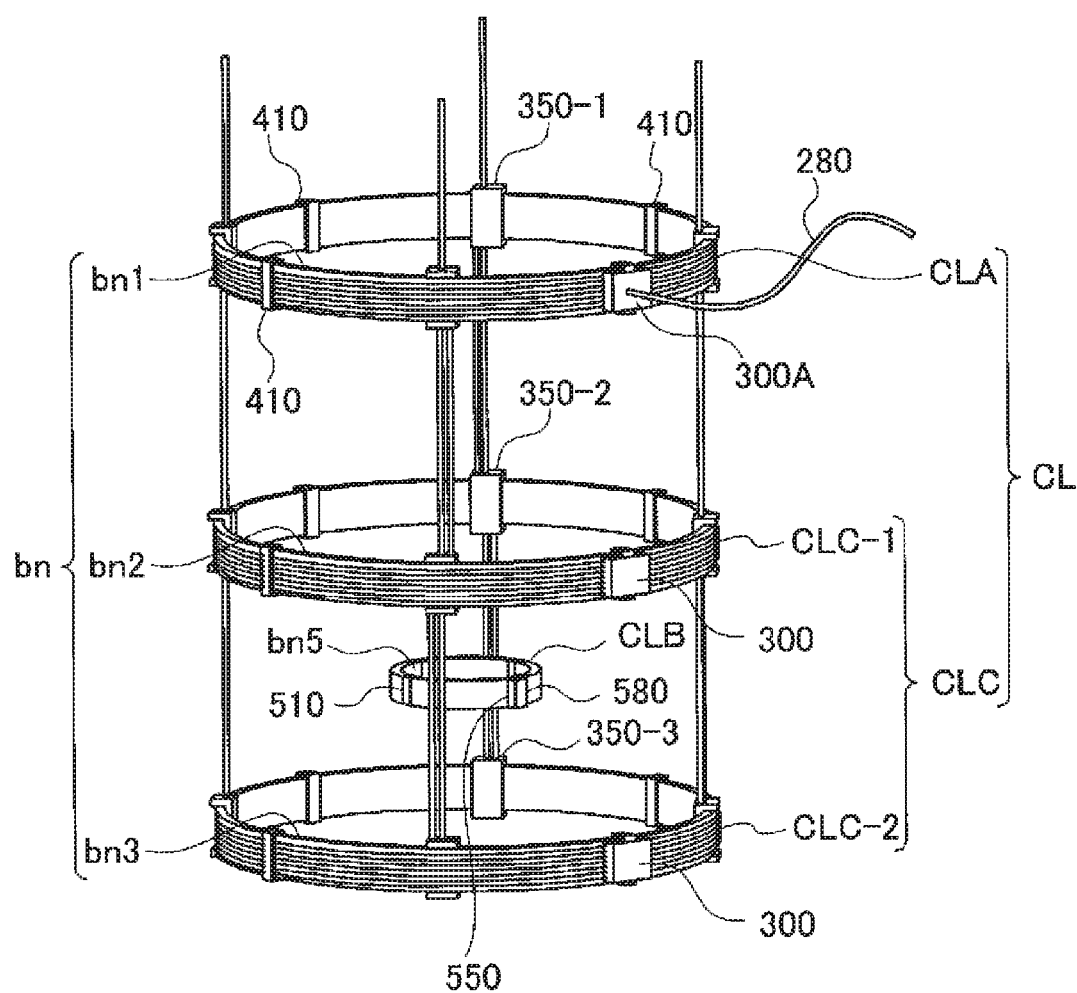
FIG. 3 is a perspective view illustrating each shape of a helically wound power transmitting coil, a relay coil, and a helically wound power receiving coil.

FIG. 3 is a perspective view illustrating each shape of the helically wound power transmitting coil CLA, the relay coil CLC, and the helically wound power receiving coil CLB. In FIG. 3, a relay coil CLC- and a relay coil CLC-2 are used as the relay coil CLC. The number of the relay coils CLC may be set to any desired number. If the number of the relay coils CLC increases, the power transmittable distance is lengthened. FIG. 3 may be referred to as appropriate in the description using other drawings to be described later.

The helically wound power transmitting coil CLA and the relay coil CLC may be wound around the outer periphery of the bobbin bn a predetermined number of times (for example, 5 times). The power transmitting coil CLA and the relay coil CLC may be fastened to the bobbin bn by using a binding band 410 at a predetermined number of locations (for example, three locations) in the outer periphery of the bobbin bn.

The helically wound power receiving coil CLB has the same basic structure as the power transmitting coil CLA, although a radial size of the coil is smaller than that of the power transmitting coil CLA. The power receiving coil CLB is wound around an outer periphery of a bobbin bn5 multiple times (for example, 5 times). In addition, the power receiving coil CLB may be fastened to the bobbin bn5 by using a binding band 510 at a predetermined number of locations (for example, three locations) in the outer periphery of the bobbin bn5.

A spacer 550 may be attached so as to grip the bobbin bn5 at a predetermined number of locations (for example, four locations) in the inner periphery of the bobbin bn5. The spacer 550 may support and pinch the power receiving coil CLB wound around the outer periphery of the bobbin bn5. In addition, a relay box 580 to which a starting end and a terminal of the power receiving coil CLB are connected may be attached to the outer periphery of the bobbin bn5.

In FIG. 3, the bobbin bn includes bobbin bn1, bn2, and bn3. However, the number of the bobbins bn may be set to any desired number. The spacer 350 includes spacers 350-1, 350-2, and 350-3. However, the number of the spacers 350 may be set to any desired number.

In FIG. 3, each length of the coil deployment rope 451 and the coil connection ropes 452 and 453 can be adjusted. In this manner, the distance between the bobbins bn and the coils CL which are adjacent to each other in the up-down direction in FIG. 3 can be changed. For example, when transported, the length of the coil deployment rope 451 and the coil connection ropes 452 and 453 are shortened so that the bobbins bn and the coils CL are closer to each other (also referred to as "folding"). When installed in the water, the length of the coil deployment rope 451 and the coil connection ropes 452 and 453 is shortened to have a constant length so that the bobbins bn and the coils CL are away from each other (also referred to as "deploying"). The stretchable bobbin which can be folded and deployed in this way is also referred to as a deploying type bobbin.

As illustrated in FIG. 3, the power transmitting system 10 can widely secure an internal space of the bobbin bn by adopting a helical winding method as a unified winding method of the respective coils CL. Therefore, even if the power transmitting device 100 cannot secure a large volume of the bobbin bn, the power transmitting device 100 can widely secure the internal space the bobbin bn, and the power receiving coil CLB of many underwater vehicles 60 can be charged. In addition, the underwater vehicle 60 equipped with the power receiving coil CLB can be downsized.

As a material of the bobbin bn, a conductive metal material may be used for a portion of the bobbin bn. In this case, a portion of the bobbin bn in the circumferential direction is electrically insulated so that the bobbin bn is not conductive in the circumferential direction. The metal material may be non-magnetic metal which does not interfere with the generation of a high frequency magnetic field. Examples of the non-magnetic metal include aluminum and some stainless steel.

Figure 4:
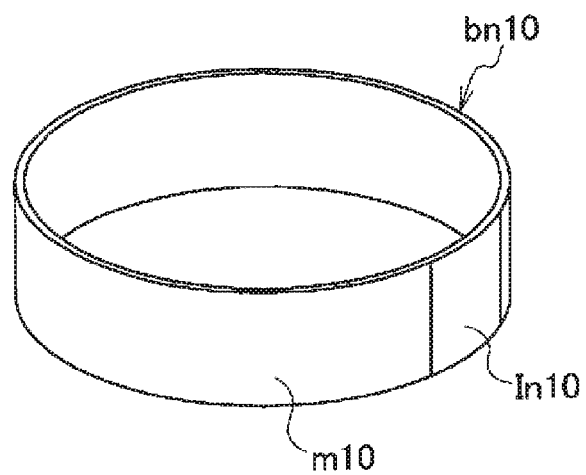
FIG. 4 is a diagram illustrating a bobbin partially molded using a non-magnetic metal material.

FIG. 4 is a diagram illustrating a bobbin bn10 partially molded using the non-magnetic metal material. The bobbin bn10 is annularly formed by non-magnetic metal m10 formed in a C-shape in the circumferential direction and an insulating material In10 formed in at least one location in the circumferential direction so as to fill a gap with the non-magnetic metal m10 in the circumferential direction. As the insulating material In10, bakelite or a glass epoxy resin may be used. The insulating material In10 allows the bobbin bn10 to be non-conductive in the circumferential direction. Accordingly, even if a metal material is used for the bobbin bn, the current does not flow in the circumferential direction of the bobbin bn, substantially similar to the non-conductive material. Therefore, the power transmitting device 100 can prevent a decrease in the power transmitting efficiency since the current flowing through the coil CL leaks to the bobbin bn10. In this way, the metal material can be used for a portion of the bobbin bn10.

Next, details of the spacer 350 will be described.

Figure 5A:
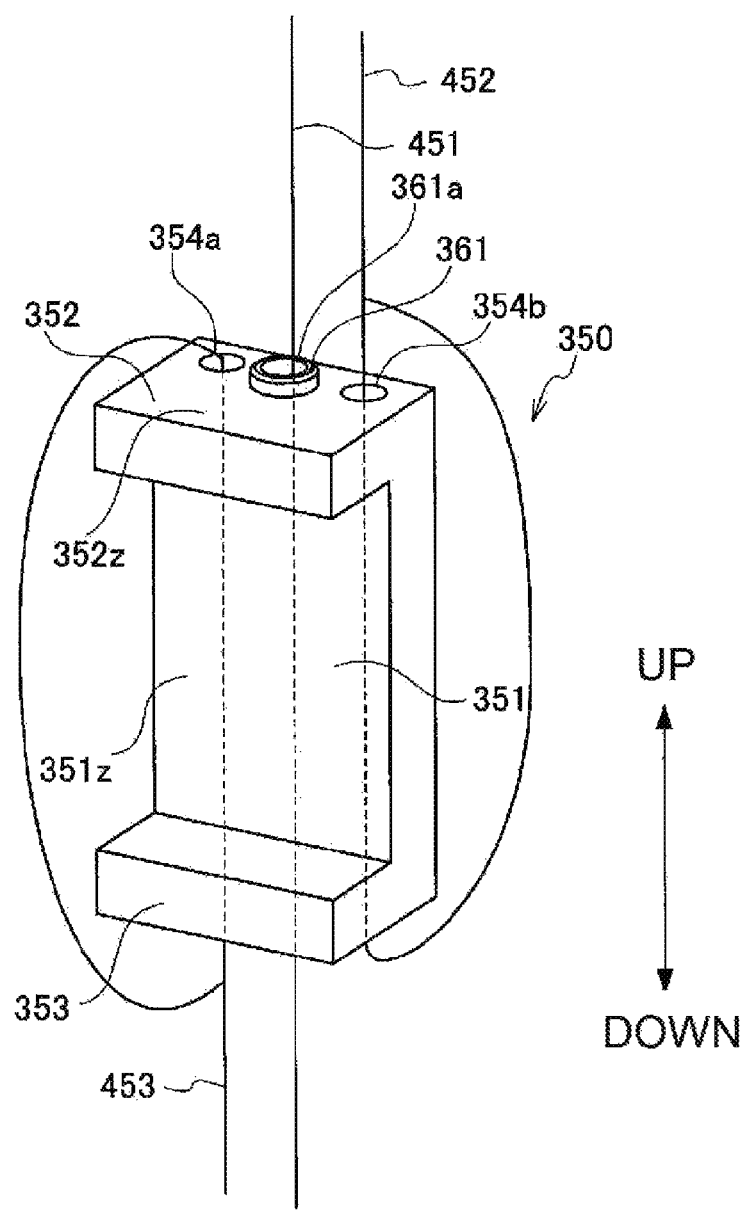
FIG. 5A is a perspective view illustrating a shape of a spacer.
Figure 5B:
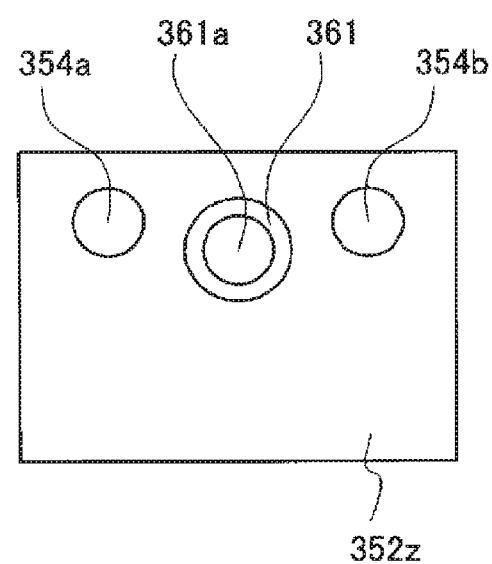
FIG. 5B is a front view illustrating a shape of an upper surface of the spacer.
Figure 5C:
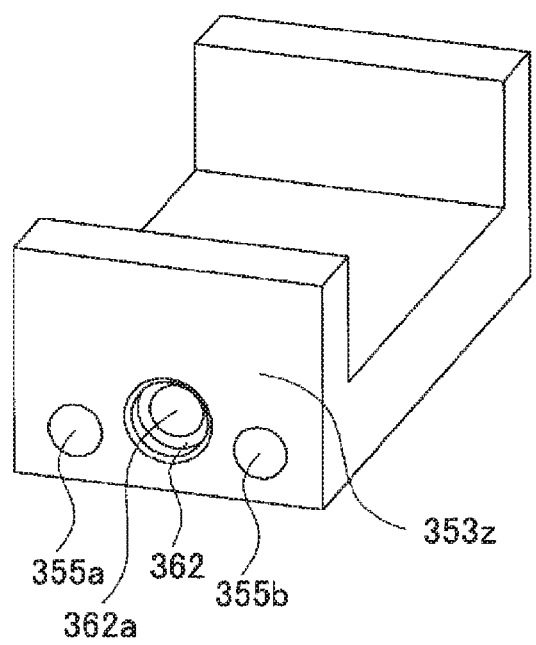
FIG. 5C is a perspective view illustrating a shape of a lower surface of the spacer.

FIG. 5A is a perspective view illustrating a shape of the spacer 350. FIG. 5B is a front view illustrating a shape of an upper surface of the spacer 350. FIG. 5C is a perspective view illustrating a shape of a lower surface of the spacer 350.

The spacer 350 has a first member 351, a second member 352, and a third member 353. The first member 351 has a first surface 351z parallel to the outer periphery of the bobbin bn. The second member 352 has a second surface 352z connected to one end portion of the first member 351 and perpendicular to the first surface. The third member 353 has a third surface 353z connected to the other end portion of the first member 351, facing the second surface, and perpendicular to the first surface. The spacer 350 may be formed in a U-shape as a whole.

Through-holes 354a and 354b for the coil connection rope are formed in two locations on the second surface (upper surface) 352z of the second member 352. In addition, through-holes 355a and 355b for the coil connection rope are formed in two locations on the third surface (lower surface) 353z of the third member 353. A coil connection rope 453 for connecting the coil CL is inserted into the upper and lower through-holes 354a and 355a The coil connection rope 453 for connecting the own spacer 350 (host spacer) and another spacer 350 (other spacers) located one stage below is inserted into the through-holes 354a and 355a. For example, the coil connection rope 453 may extend from the other spacer located one stage below, may pass from the lower side to the upper side of the through-hole 355a of the third member 353, may pass from the lower side to the upper side of the through-hole 354a of the first member 351, may be folded back from the upper side to the lower side outside the host spacer, and may be fastened to the coil connection rope 453 extending from the other spacer located one stage below on the lower side of the through-hole 355a of the third member 353. That is, the coil connection rope 453 may turn once around the spacer 350 via the through-holes 354a and 355a.

Similarly, the coil connection rope 452 for connecting the host spacer to the other spacer located one stage above is inserted into the through-holes 354a and 355b. For example, the coil connection rope 452 may extend from the other spacer located one stage above, may pass from the upper side to the lower side of the through-hole 354b of the first member 351, may pass from the upper side to the lower side of the through-hole 355b of the third member 353, may be folded back from the lower side to the upper side outside the host spacer, and may be fastened to the coil connection rope 452 extending from the other spacer located one stage above on the upper side of the through-hole 354b of the first member 351. That is, the coil connection rope 452 may turn once around the spacer 350 via the through-holes 354b and 355b.

The length of the coil connection ropes 452 and 453 is constant between both the host spacer and the other adjacent spacers located up and down. Therefore, when the respective coils CL are deployed, the distance between the upper and lower spacers 350, that is, the distance (interval) between the coils CL is constant. This is the same in any of the other spacers 350 which pinch the same bobbin bn or the same coil CL. Accordingly, the length of the coil connection ropes 452 and 453 is constant in any spacer arrangement location in the horizontal direction, thereby maintaining the balance of the coil CL in the horizontal direction.

On the second surface 352z of the second member 352, a projection portion 361 for positioning when the spacers 350 are stacked up and down is formed between the through-holes 354a and 354b. A through-hole 361a for the coil deployment rope is formed in a central portion of the projection portion 361. Similarly, on the third surface 353z of the third member 353, a recess portion 362 for positioning to engage with (for example, fit to) the projection portion 361 of the second member 352 of the other spacer when the spacers 350 are stacked up and down is formed between the through-holes 355a and 355b. A through-hole 362a for the coil deployment rope is formed in the central portion of the recess portion 362 of the spacer 350 so as to face the through-hole 361a formed in the projection portion 361 of the other spacer. One coil deployment rope 451 is inserted into the through-holes 361a and 362a aligned with each other up and down. The through-holes 361a and 362a aligned with each other up and down are respectively formed in the plurality of spacers 350 which are aligned with each other in the transmitting direction and which respectively grip the coils CL (the power transmitting coil CLA and the relay coils CLC-1 and CLC-2).

The coil deployment rope 451 extends (is deployed) in the up-down direction. In this manner, three coils CL are suspended, and the power transmitting coil CLA and the relay coils CLC-1 and CLC-2 are aligned with each other in the transmitting direction. In addition, the coil connection ropes 452 and 453 are aligned with each other to have a constant length. In this manner, the power transmitting coil CLA and the relay coils CLC-1 and CLC-2 which are gripped by the respective spacers 350 are held at a constant interval in the transmitting direction.

In this way, the coil deployment rope 451 and the coil connection ropes 452 and 453 (example of a connection member having a predetermined length) can maintain the balance of the respective spacers 350 in the horizontal direction in a state where the coil deployment rope 451 and the coil connection ropes 452 and 453 are deployed, and the interval between the spacers 350 in a gravity direction (water depth direction) (example of the transmitting direction) can be maintained constant. Therefore, in the state where the coil deployment rope 451 and the coil connection ropes 452 and 453 are deployed, the three coils CLs including the bobbin bn gripped by the respective spacers 350 have satisfactory balance in the horizontal direction, and are positioned at a predetermined interval in the gravity direction. In this manner, the plurality of (three in FIG. 3) coils CL are prevented from being misaligned in the transmitting direction. Accordingly, the transmitting efficiency of the power is improved.

In addition, the length of the coil connection ropes 452 and 453 is adjusted in the gravity direction. In this manner, the respective coils CL can be arranged in view of the transmitting distance of one coil CL and other circumstances. The length of the coil connection ropes 452 and 453 may be adjusted in view of the power frequency, the power transmitting distance based on the medium, or the underwater condition such as a water flow.

Figure 6:
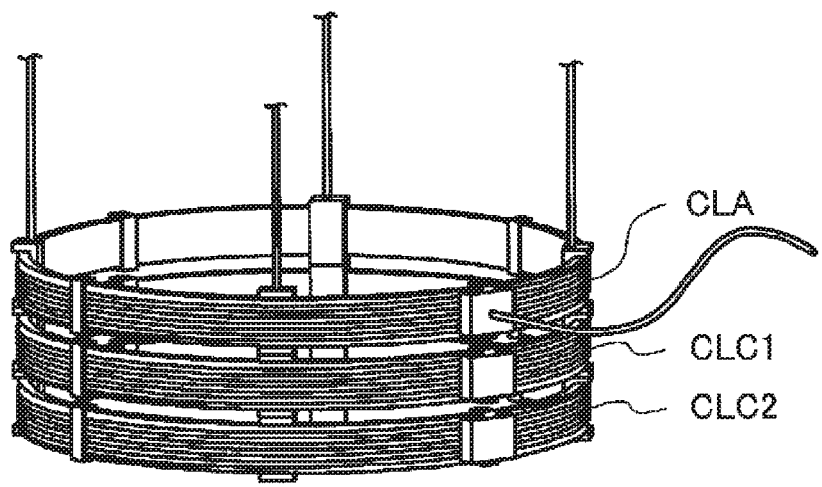
FIG. 6 is a perspective view illustrating three coils in a folded state.

On the other hand, in a case where the three coils CL are not deployed (are folded), the projection portion 361 formed on the second surface 352z of the host spacer engages with (for example, fits to) the recess portion 362 formed on the third surface 353z of the other spacer located one stage above. Similarly, the recess portion 362 formed on the third surface 353z of the host spacer engages with (for example, fits to) the projection portion 361 formed on the second surface 352z of the other spacer located one stage below. In this manner, the three spacers 350 aligned with each other in the transmitting direction are connected by coming into contact with each other, and the three coils CL have a compact shape. FIG. 6 is a perspective view illustrating the three coils CL in a folded state. In this way, the distance is shortened between the plurality of coils CL in the transmitting direction. Accordingly, an arrangement range of the plurality of coils CL is narrowed in the gravity direction, and overall dimensions of the required members (the bobbin bn, the coil CL, and the spacer 350) for transmitting the power in the water are reduced. Therefore, it becomes easy to transport the required members for transmitting the power in the water. The coils CL may be deployed as follows. The required members for transmitting the power in the water are transported in the folded state on the land or on the sea as illustrated in FIG. 6. The required members for transmitting the power in the water are sunk at a desired place in the water.

In this way, in the power transmitting device 100, the wound coils CL can be bundled by using the spacer 350. In addition, the power transmitting device 100 uses the spacer 350. In this manner, the bobbin bn and the coil CL can be prevented from spreading in the transmitting direction, and inward deformation of the coil CL can be reliably prevented. In addition, the power transmitting device 100 uses the spacer 350. In this manner, the deploying type (stretchable) bobbin bn can have a compact size when transported on the land or on the sea. Furthermore, the position can be regulated by the projection portion 361 and the recess portion 362. Accordingly, the deploying type bobbin bn can be stably transported.

In addition, if the projection portion 361 and the recess portion 362 of the adjacent spacers 350 are combined with each other, a positional relationship of the plurality of spacers 350 can be fixed, and the plurality of spacers 350 can be stacked on each other. In addition, the coil connection ropes 452 and 453 pass through the through-hole of the spacer 350. In this manner, each position of the coils CL can be guided to a proper position even in a state where the coil CL is deployed.

Figure 7A:
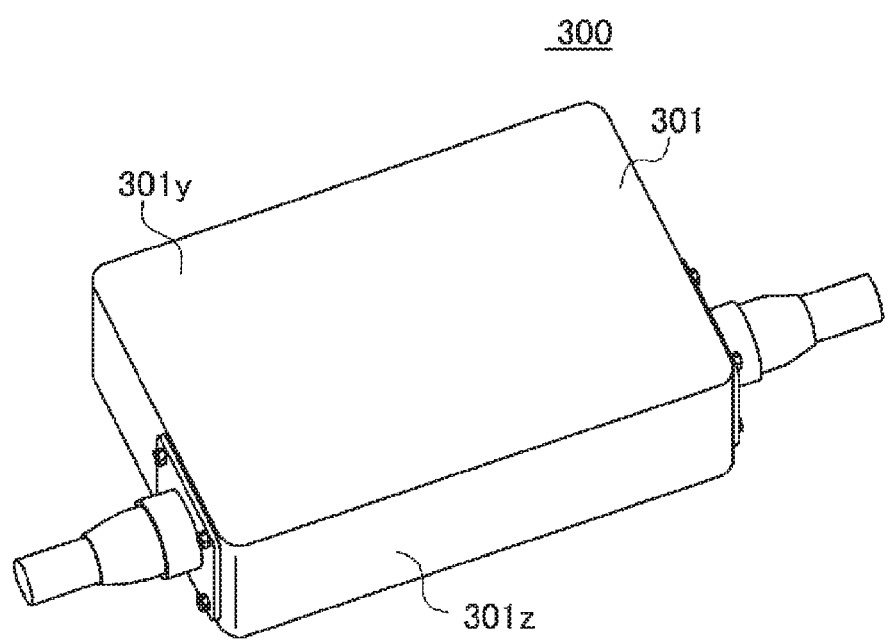
FIG. 7A is a perspective view illustrating an external appearance of a relay box.
Figure 7B:
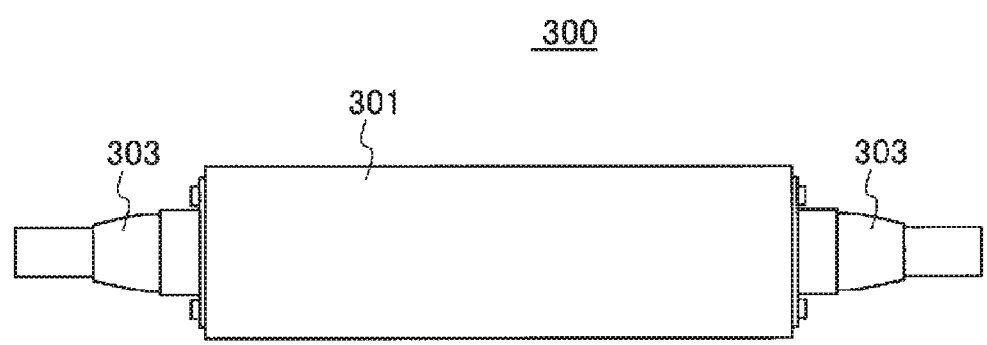
FIG. 7B is a front view illustrating the external appearance of the relay box.
Figure 7C:
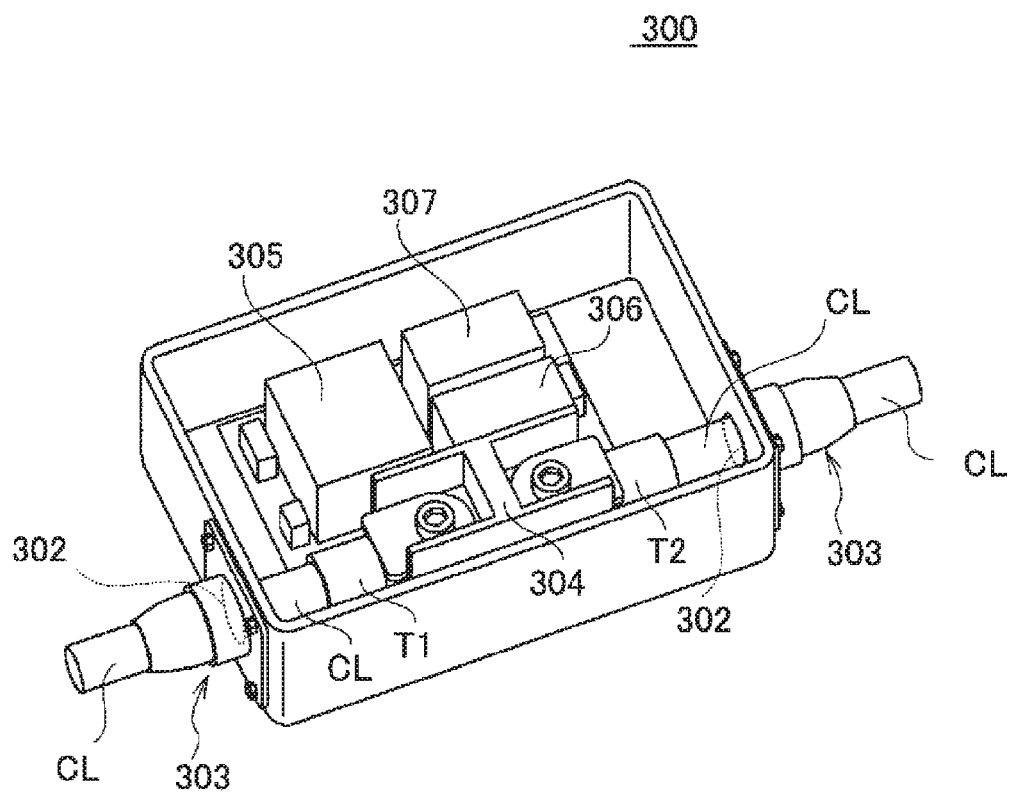
FIG. 7C is a perspective view illustrating an internal structure of the relay box.
Figure 7D:
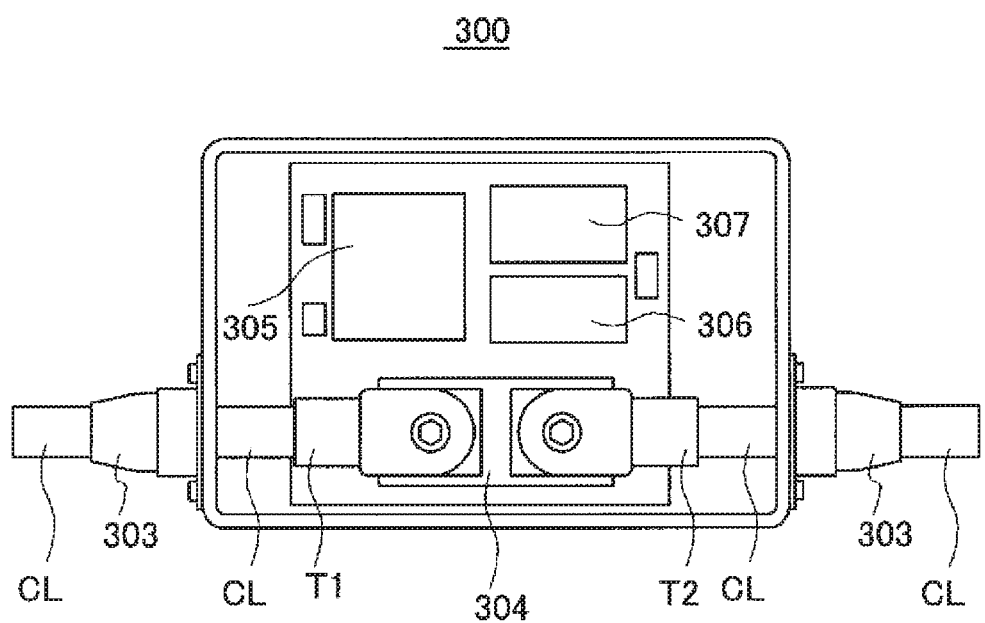
FIG. 7D is a plan view illustrating the internal structure of the relay box.

FIG. 7A is a perspective view illustrating an external appearance of the relay box 300. FIG. 7B is a front view illustrating the external appearance of the relay box 300. FIG. 7C is a perspective view illustrating the external appearance of the relay box 300. FIG. 7D is a plan view illustrating the external appearance of the relay box 300. The relay coil CLC is attached to the relay box 300. In FIG. 3, a relay box 300A to which the power transmitting coil CLA is attached has substantially the same internal structure as that of the relay box 300 except that a power cable 280 is connected, and thus, description thereof will be omitted. The power cable 280 may correspond to the cable 20 illustrated in FIG. 1.

The relay box 300 may have a box-shaped housing 301. The housing 301 may have a frame 301z and a lid 301y covering an opening of the frame 301z. The lid 301y may engage with the frame 301z, and may be detachable from the frame 301z.

A capacitor 305, a relay circuit 306, and a control circuit 307 may be accommodated inside the housing 301, and other electric components or electronic components may be accommodated. The power based on the current flowing through the coil CL to which the starting end and the terminal are connected in the relay box 300 is supplied to the relay circuit 306 and the control circuit 307. In addition, a signal (for example, a control signal or a communication signal) may be superimposed on the power based on the current flowing through the coil CL. For example, the signal may be an amplitude shift keying (ASK) signal or a frequency shift keying (FSK) signal. At least some of the configuration elements of the power transmitting device 100 illustrated in FIG. 2 may be disposed inside the housing 301.

Further, openings 302 into which a starting end T1 or a terminal T2 of the coil CL is inserted are respectively disposed on both side surfaces of the housing 301. Each of the waterproof connectors 303 is attached to each of the openings 302 to face outward of the housing 301. For example, elastomer, hard plastic, or metal may be used for the waterproof connector 303. The starting end T1 and the terminal T2 of the coil CL are inserted into the waterproof connector 303 and the opening 302, and are connected to each other in a terminal connection portion 304. The waterproof connector 303 seals the coil CL in the circumferential direction. Accordingly, the relay box 300 can prevent a gap from being generated between the coil CL and the waterproof connector 303. Therefore, the relay box 300 can prevent water from entering the inside of the housing 301 via the opening 302 from the waterproof connector 303.

The opening 302 exists in a passage portion (coupling portion between the coil CL and the housing 301) of the relay box 300 where the coil CL passes through the inside of the housing 301, and the water is relatively easy to enter. In contrast, the power transmitting device 100 uses the waterproof connector 303. In this manner, the water can be prevented from entering the passage portion where the coil CL passes through the inside of the housing 301. Accordingly, a short circuit can be prevented from occurring since the electric components or the electronic components (for example, the capacitor 305, the relay circuit 306, and the control circuit 307) inside the relay box 300 come into contact with the water. In addition, in a case where a general-purpose product is used as the waterproof connector 303, waterproofing inside the relay box 300 can be easily and inexpensively performed.

If the starting end T1 and the terminal T2 of the coil CL are connected to each other in the relay box 300, both of these are electrically connected to each other via the capacitor 305. In this manner, the capacitor 305 and the coil CL form an LC resonance circuit. In a case of the relay box 300 to be attached to the relay coil CLC, the capacitor 305 corresponds to the capacitor CC which forms the LC resonance circuit together with the relay coil CLC. In addition, in a case of the relay box 300A to be attached to the power transmitting coil CLA, the capacitor 305 corresponds to the capacitor CA which forms the LC resonance circuit together with the power transmitting coil CLA.

The relay circuit 306 may individually switch the plurality of capacitors 305 to be connected to the coil CL. The control circuit 307 may drive the relay circuit 306 to connect the selected capacitor 305 to the coil CL in response to the resonance frequency of the LC resonance circuit. In this manner, the relay box 300 can set a desired frequency to the resonance frequency by setting capacitance of the capacitor to desired capacitance, and can realize the power transmitting or communication at the resonance frequency.

The housing 301 may be internally filled with oil. That is, the interior of the housing 301 may be in an oil-tight state. The oil is not mixed with water, and the relay box 300 is brought into the oil-tight state. In this manner, waterproof performance in the relay box 300 is improved. In addition, insulating oil is used. Accordingly, the electricity is not supplied, and a shortage of a circuit board is less likely to occur. In addition, the insulation of the electronic component accommodated in the housing 301 is improved. In addition, the specific gravity of the oil is lower than that of the water. Accordingly, neutral buoyancy is likely to appear in the relay box 300. In addition, the housing 301 is internally brought into the oil-tight state. In this manner, corrosion resistance of the electronic component or the electric component inside the relay box 300 is improved. Instead of filling the housing 301 with the oil, the housing 301 may be filled with a resin. Similarly, a waterproof effect is achieved.

Hereinafter, CLn and CLn-m, (n and m are integers) may be illustrated as examples of the coil CL, but these are examples of the coil CL. Similarly, CLAn and CLAn-m may be illustrated as examples of the power transmitting coil CLA, but these are examples of the power transmitting coil CLA. Similarly, CLbn and CLBn-m may be illustrated as examples of the power receiving coil CLB, but these are examples of the power receiving coil CLB. Similarly, CLCn and CLCn-m may be illustrated as examples of the relay coil CLC, but these are examples of the relay coil CLC.

Next, a combination of the helically wound power transmitting coil CLA, the relay coil CLC, and the spirally wound power transmitting coil CLB1 will be described.

Figure 8:
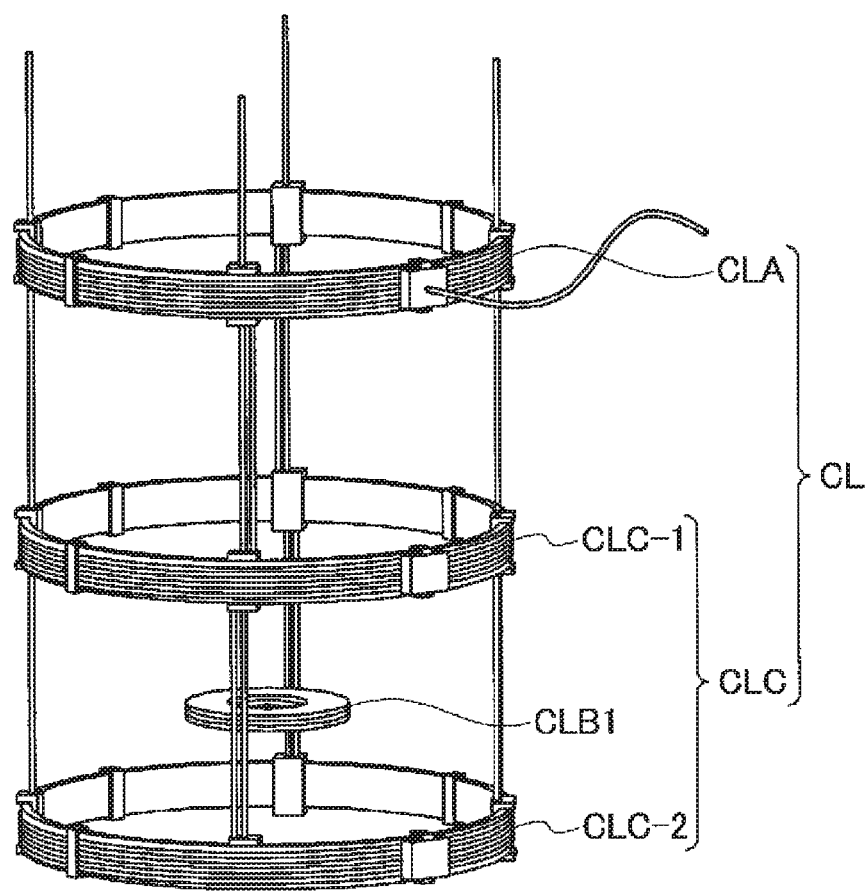
FIG. 8 is a perspective view illustrating each shape of a helically wound power transmitting coil, a relay coil, and a spirally wound power receiving coil.

FIG. 8 is a perspective view illustrating each shape of the helically wound power transmitting coil CLA, the relay coil CLC, and the spirally wound power receiving coil CLB1. The helically wound coil CL (the power transmitting coil CLA, the relay coil CLC) has the same structure as that of the helically wound coil CL described above. The structure of the spirally wound power receiving coil CLB1 is the same as the structure of the spirally wound power transmitting coil CLA1, and details thereof will be described later.

As illustrated in FIG. 8, the power transmitting system 10 can widely secure an internal space of the bobbin bn by using the helically wound power transmitting coil CLA and the relay coil CLC. Therefore, even in a case where the power transmitting device 100 cannot widely secure a volume of the bobbin bn, the internal space of the bobbin bn can be widely secured, and the power receiving coil CLB of many submarines 70 can be charged. In addition, the spirally wound power receiving coil CLB is used. In this manner, the thickness of the submarine 70 equipped with the power receiving coil CLB can be reduced, thereby enabling the thinner submarine 70 to be achieved.

Next, details of the spirally wound coil will be described with reference to FIGS. 9A to 9C and 10A to 10C.

Figure 9A:
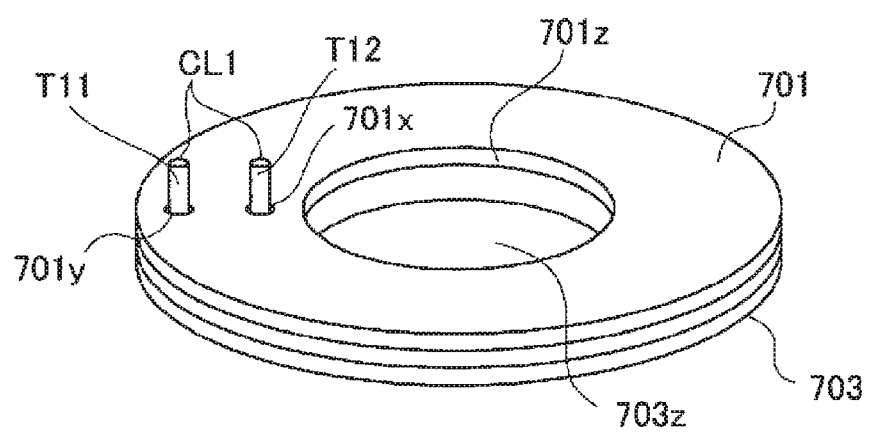
FIG. 9A is a perspective view illustrating a structure of a spirally wound coil.
Figure 9B:
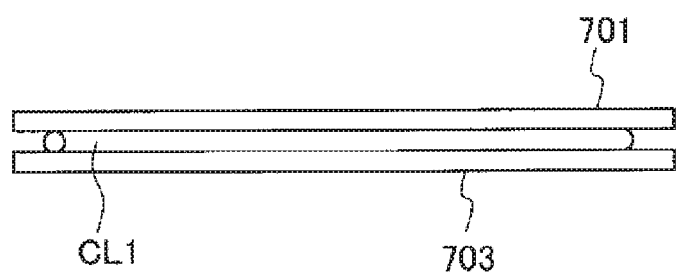
FIG. 9B is a front view illustrating the structure of the spirally wound coil.
Figure 9C:
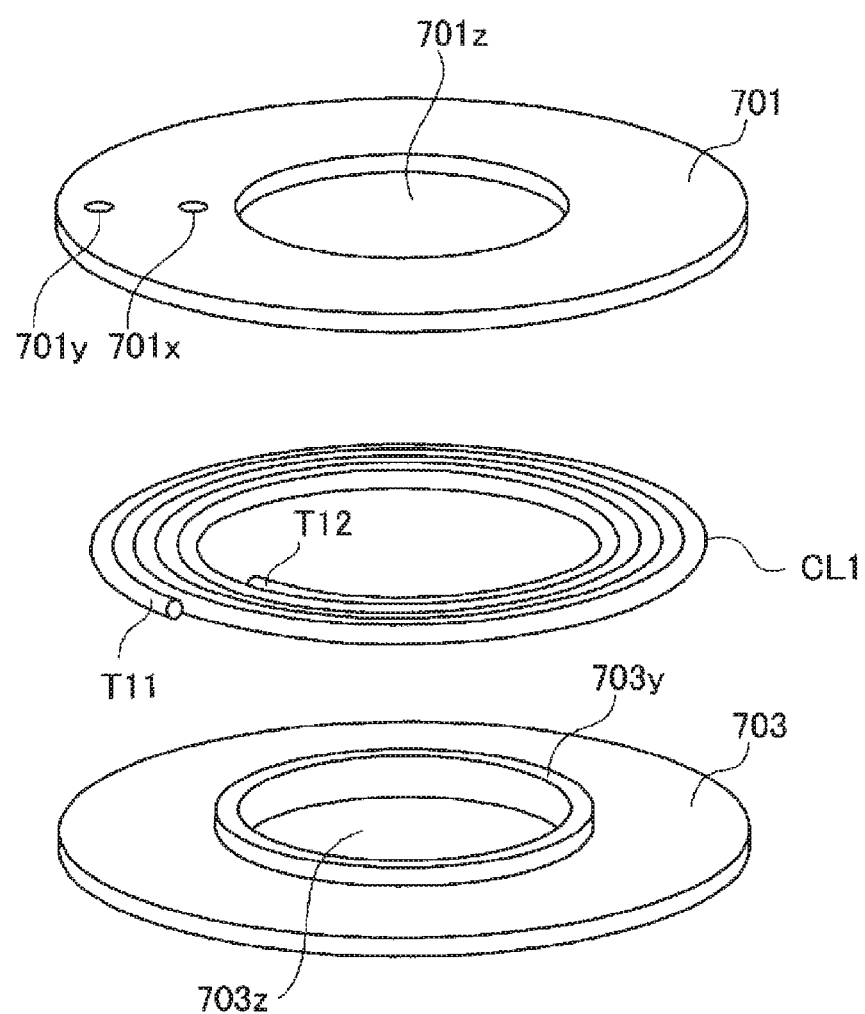
FIG. 9C is an exploded perspective view illustrating the structure of the spirally wound coil.
Figure 10A:
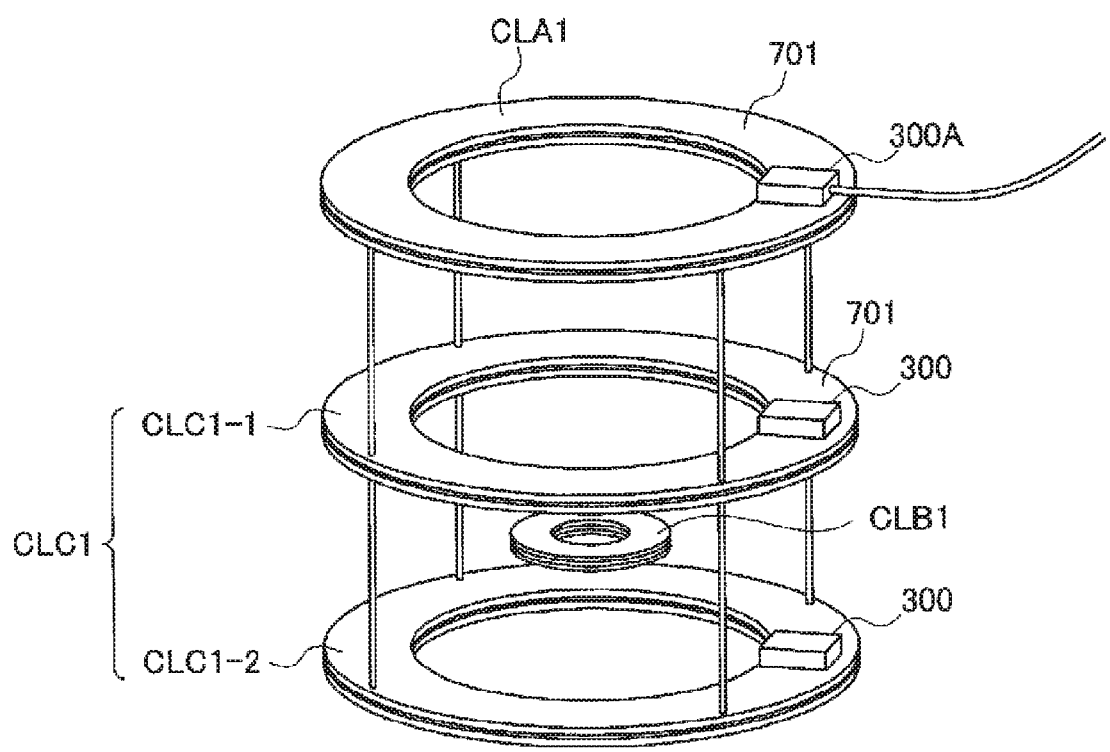
FIG. 10A is a perspective view illustrating each shape of a spirally wound power transmitting coil, a relay coil, and a spirally wound power receiving coil.

FIG. 9A is a perspective view illustrating a structure of the spirally wound coil CL1 (for example, the power transmitting coil CLA1, the relay coil CLC1, and the power receiving coil CLB1 which are illustrated in FIG. 10A (to be described later)). FIG. 9B is a front view illustrating the structure of the spirally wound coil CL1. FIG. 9C is an exploded perspective view illustrating the structure of the spirally wound coil CL1.

As illustrated in FIGS. 9A to 9C, the coil CL1 is formed by being spirally wound (spiral shape). The coil CL1 may be pinched by a first support plate (structure plate) 701 and a second support plate (structure plate) 703. The first support plate 701 may be a hollow disc formed around an opening 701z. Similarly, the second support plate 703 may be a hollow disc formed around an opening 703z.

Through-holes 701y and 701x into which a starting end T11 and a terminal T12 of the coil CL1 are inserted may be formed in the first support plate 701. The relay box 300 may be attached to the upper surface of the first support plate 701. The starting end T11 and the terminal T12 of the coil CL1 passing through the through-holes 701y and 701x may pass through the inside of the waterproof connector 303 of the relay box 300, and may be connected to the terminal connection portion 304.

A rib 703y may be formed in a peripheral edge of the opening 703z of the second support plate 703 so as to project in the transmitting direction. The coil CL may be spirally wound so that the innermost periphery extends along the outer periphery of the rib 703y. That is, the spirally wound coil CL1 may be formed by being wound from the innermost periphery along the outer periphery of the rib 703y (example of the support member). In this manner, the rib 703y comes into contact with the coil CL1 in a case where the coil CL1 is deformed inward. Accordingly, the coil CL1 can be prevented from being deformed inward. As a material of the first support plate 701 and the second support plate 703, the same material as that of the bobbin bn described above may be used.

Even in a case of the spirally wound coil CL1, in the power transmitting device 100 and the power receiving device 200, the innermost peripheral portion of the coil CL1 is not deformed inward. In this manner, the wound coil CL1 can be prevented from being deformed. In addition, the coil CL1 is pinched by the first support plate 701 and the second support plate 703. Accordingly, the coil CL1 can be protected from external pressure acting in the up-down direction. In addition, even in a case of the spirally wound coil CL1, the coil CL1 can form the LC resonance circuit together with the capacitor inside the relay boxes 300 and 580, and thus, the power can be transmitted and received. In addition, in a case of the spirally wound coil CL1, the thickness of the coil CL1 can be reduced. Therefore, since the coil CL is spirally wound, there is a space margin in the transmitting direction around the coil CL1.

In this way, the power transmitting device 100 and the power receiving device 200 can maintain the strength of the spirally wound coil CL1 by using the support plate, and can easily regulate the position in the transmitting direction.

Next, a combination of the spirally wound power transmitting coil CLA1, the relay coil CLC1, and the spirally wound power receiving coil CLB1 will be described.

Figure 10B:
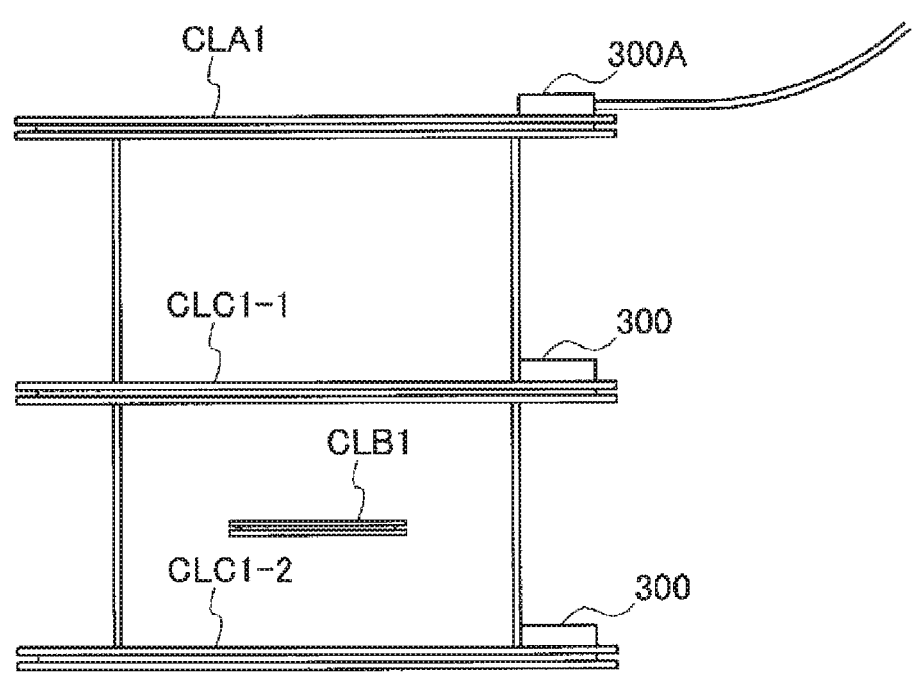
FIG. 10B is a front view illustrating each shape of the spirally wound power transmitting coil, the relay coil, and the spirally wound power receiving coil.

FIG. 10A is a perspective view illustrating each shape of the spirally wound power transmitting coil CLA1, the relay coil CLC1, and the spirally wound power receiving coil CLB1. FIG. 10B is a front view illustrating each shape of the spirally wound power transmitting coil CLA1, the relay coil CLC1, and the spirally wound power receiving coil CLB.

The structure of the spirally wound power transmitting coil CLA1 and the relay coil CLC1 (CLC1-1 and CLC1-2) is as illustrated in FIGS. 9A to 9C. The power transmitting coil CLA1 and the relay coils CLC1-1 and CLC1-2 have a larger coil diameter size than that of the power receiving coil CLB1.

The relay box 300 has the same structure as that in a case of the helically wound power transmitting coil CLA described above. In a case of the helically wound power transmitting coil CLA, the relay box 300 may be attached to a side surface (outer periphery surface) of the coil CL, for example. In a case of the spirally wound power transmitting coil CLA1, the relay box 300 may be attached to an upper surface of the first support plate 701.

In a case where the spirally wound power transmitting coil CLA1, the relay coil CLC1, and the spiral wound power receiving coil CLB1 are combined with each other, the thickness of the power transmitting coil CLA1, the relay coil CLC1, and the power receiving coil CLB1 can be reduced. Therefore, since the spirally wound power transmitting coil CLA1 and the relay coil CLC1 are used, there is the wider space margin in the transmitting direction around the power transmitting coil CLA1. Accordingly, the underwater vehicle 60 having more power receiving coils CLB1 in the transmitting direction around the power transmitting coil CLA1 can enter a power transmitting area, and can supply the power to many underwater vehicles 60.

[Configuration Example of Power Supply Stand]

Next, various aspects of a power supply stand using at least the power transmitting coil CLA and the power receiving coil CLB will be described. For example, the power supply stand may be a facility which performs underwater power supply.

Figure 11A:
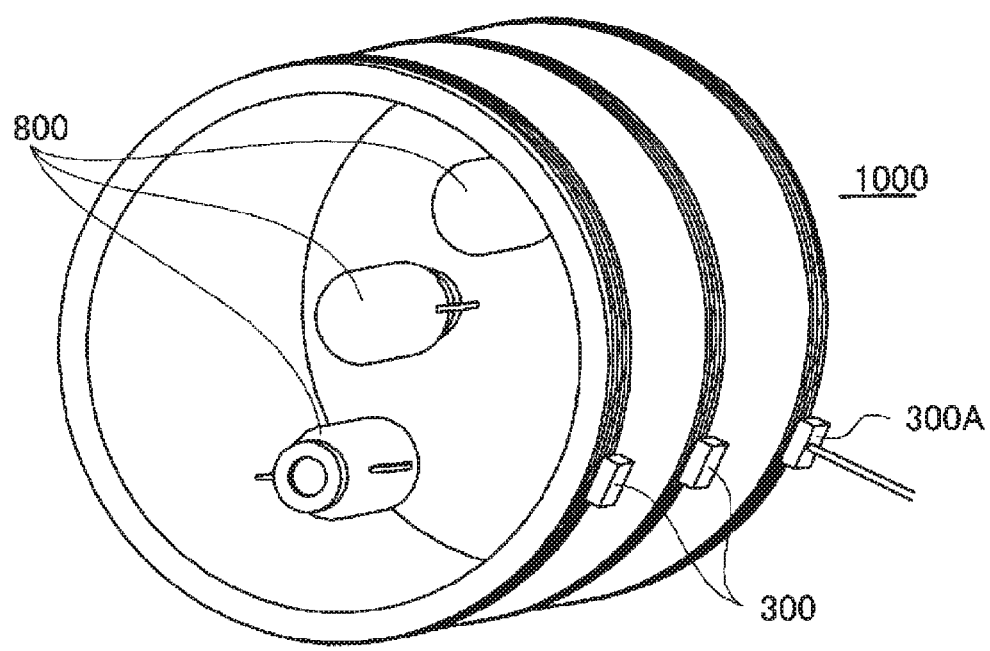
FIG. 11A is a perspective view illustrating an external appearance of a horizontal type power supply stand using the helically wound coil.
Figure 11B:
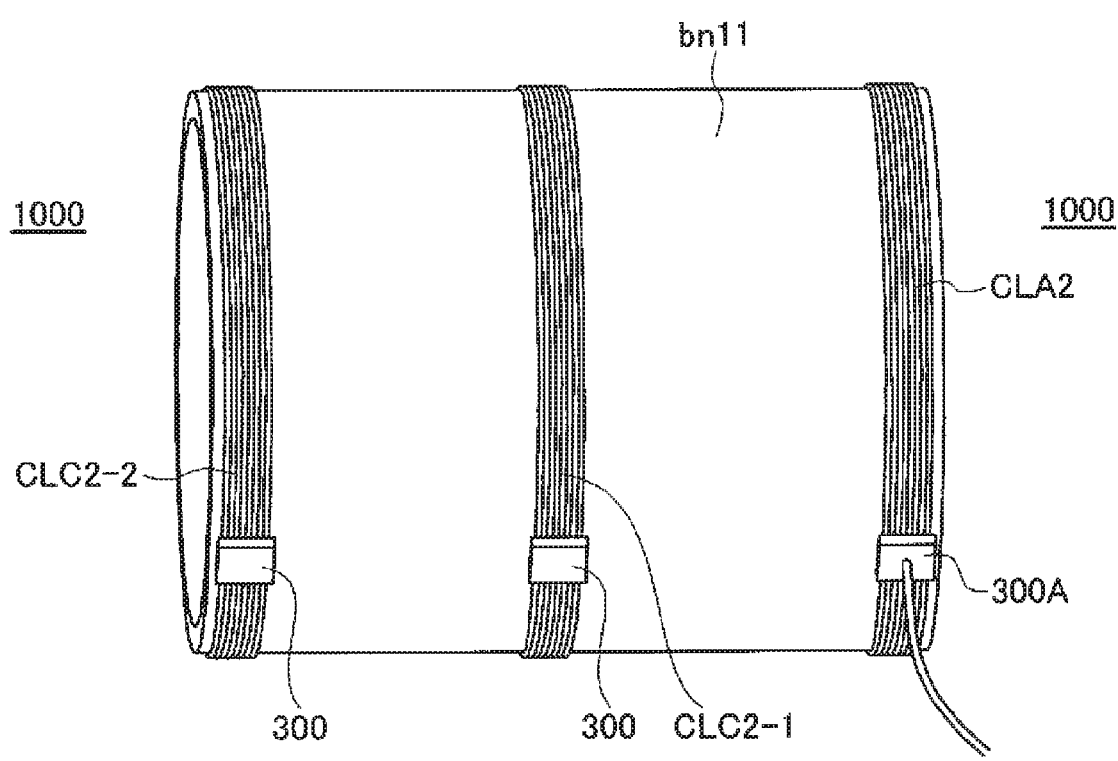
FIG. 11B is a front view illustrating the external appearance of the horizontal type power supply stand using the helically wound coil.
Figure 11C:
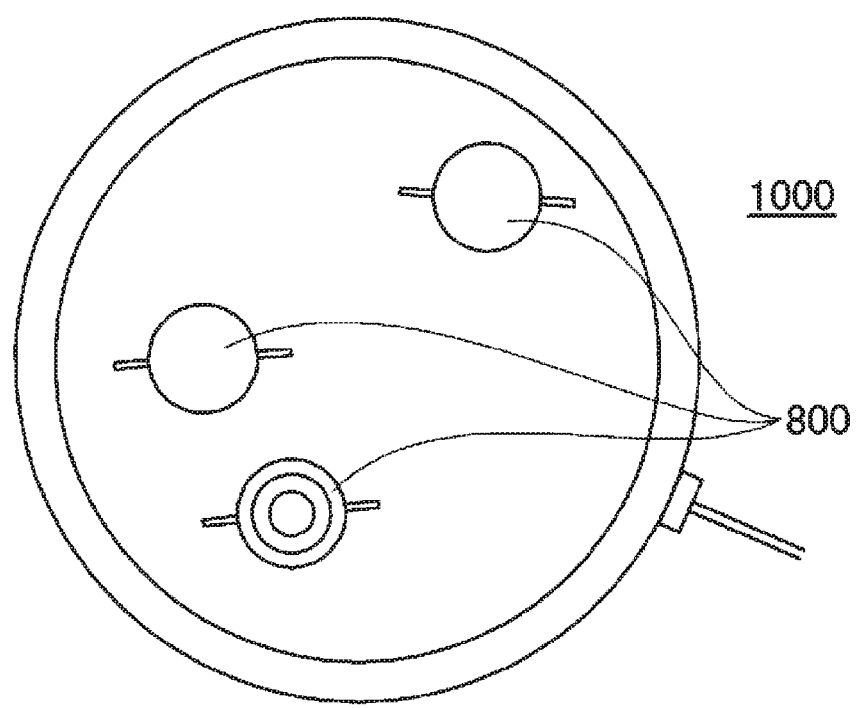
FIG. 11C is a side view illustrating the external appearance of the horizontal type power supply stand using the helically wound coil.

FIG. 11A is a perspective view illustrating an external appearance of a horizontal type power supply stand 1000 using a helically wound coil. FIG. 11B is a front view illustrating the external appearance of the horizontal type power supply stand 1000 using the helically wound coil. FIG. 11C is a side view illustrating the external appearance of the horizontal type power supply stand 1000 using the helically wound coil. The power supply stand 1000 may be a bobbin structure including a function as the bobbin.

The power supply stand 1000 serving as the bobbin structure may be formed of non-metallic concrete or a pipe. The power supply stand 1000 formed of concrete is not deployed, and does not stretch unlike the deploying type bobbin described above. In addition, even if the spacer 350 is not used for the power supply stand 1000, each coil CL is fixed to a predetermined position in the power supply stand 1000. In this manner, the position of each coil CL in the transmitting direction can be fixed. The same applies to subsequent power supply stands 1000A and 1000B.

The power supply stand 1000 has a bobbin bn11 having a cylindrical shape (hollow columnar shape) which is long in the transmitting direction. A power transmitting coil CLA2 is located in an outer periphery of one end portion of the bobbin bn1 having the cylindrical shape. A relay coil CLC2-1 is located in an outer periphery of a central portion of the bobbin bn11. A relay coil CLC2-2 is located in an outer periphery of the other end portion of the bobbin bn11. The relay boxes 300 are respectively attached to the outer peripheries of the power transmitting coil CLA2, the relay coil CLC2-1, and the relay coil CLC2-2.

In the power supply stand 1000, the power transmitting coil CLA2 and the relay coils CLC2-1 and CLC2-2 are formed by being wound around the outer periphery of the common bobbin bn11. Therefore, both the interval between the power transmitting coil CLA2 and the relay coil CLC2-1 and the interval between the relay coil CLC2-1 and the relay coil CLC2-2 are fixed to a constant value. In addition, the power transmitting coil CLA2 and the relay coils CLC2-1 and CLC2-2 are fixed around the cylindrical bobbin bn1. In this manner, there is no misalignment in the radial direction between the power transmitting coil CLA2 and the relay coil CLC2-1, and there is no misalignment in the radial direction between the relay coil CLC2-1 and the relay coil CLC2-2. In addition, since the inside is supported by the bobbin bn11 the power transmitting coil CLA2 and the relay coils CLC2-1 and CLC2-2 are not deformed. In this way, the positional relationship between the power transmitting coil CLA2 and the relay coils CLC1-1 and CLC1-2 is fixed, thereby improving the power transmitting efficiency.

The cylindrical bobbin bn11 is internally hollow. Therefore, in a case where the power supply stand 1000 is sunk in the water, underwater equipment (for example, an AUV 800) equipped with the power receiving device 200 including the power receiving coil CLB has a free access to the power supply stand 1000. The underwater equipment stays inside the cylindrical bobbin bn11. In this manner, the power receiving coil CLB inside the underwater equipment can receive the power from the coil CL (for example, the power transmitting coil CLA2 and the relay coils CLC2-1 and CLC2-2).

In this way, the bobbin bn11 is internally hollow in the power supply stand 1000. Accordingly, the underwater equipment has an easy access to the power supply stand 1000. In addition, the power supply stand 1000 can be less likely to receive the influence of tidal currents, depending on the arrangement direction of the power supply stand 1000, and the underwater equipment is likely to stay inside the power supply stand 1000. Therefore, for example, many AUVs 800 can enter the inside of the power supply stand 1000. Accordingly, the power can be easily supplied at the same time. In addition, the inside of the power supply stand 1000 (inside of the bobbin bn11) can also be used as a station (depot) or a hangar in which the underwater equipment temporarily stays.

Here, it is assumed that the power supply stand 1000 is horizontally placed. However, the power supply stand 1000 may be vertically placed and used, depending on situations of the water currents or the tidal currents.

Figure 12A:
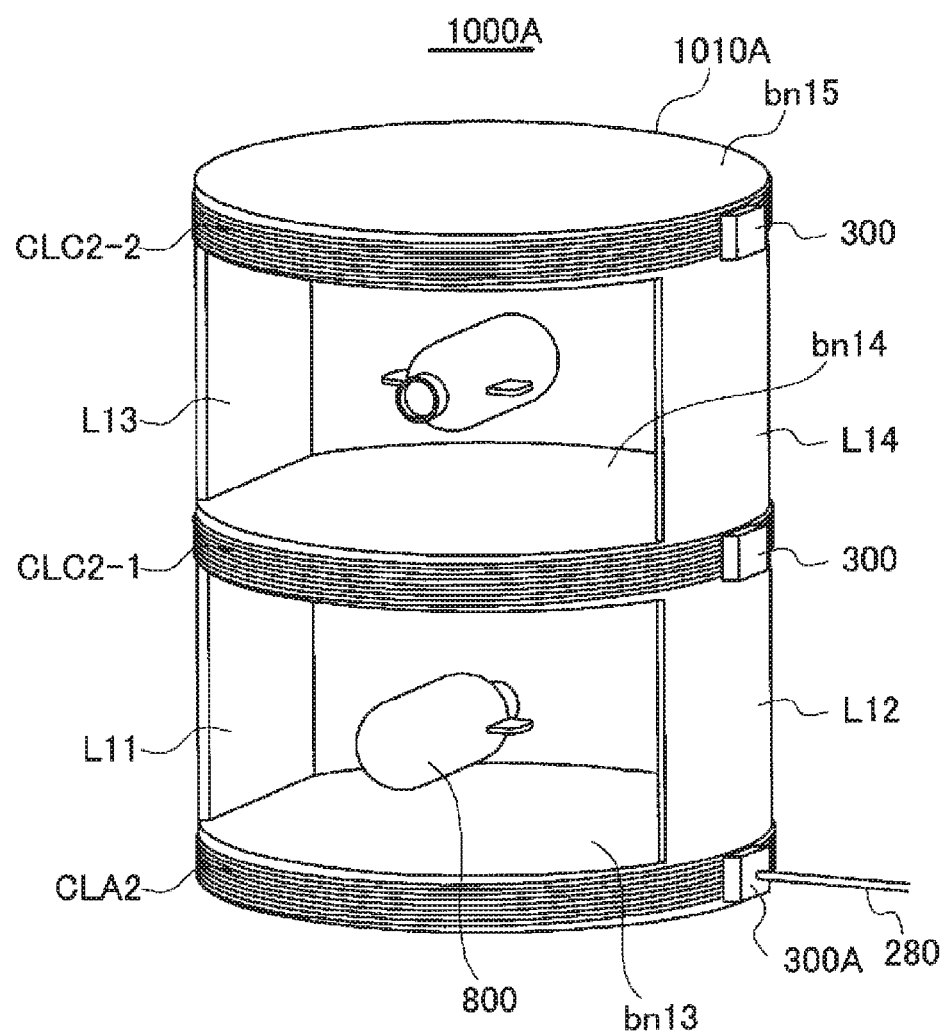
FIG. 12A is a perspective view illustrating an external appearance of a vertical type power supply stand using the helically wound coil.
Figure 12B:
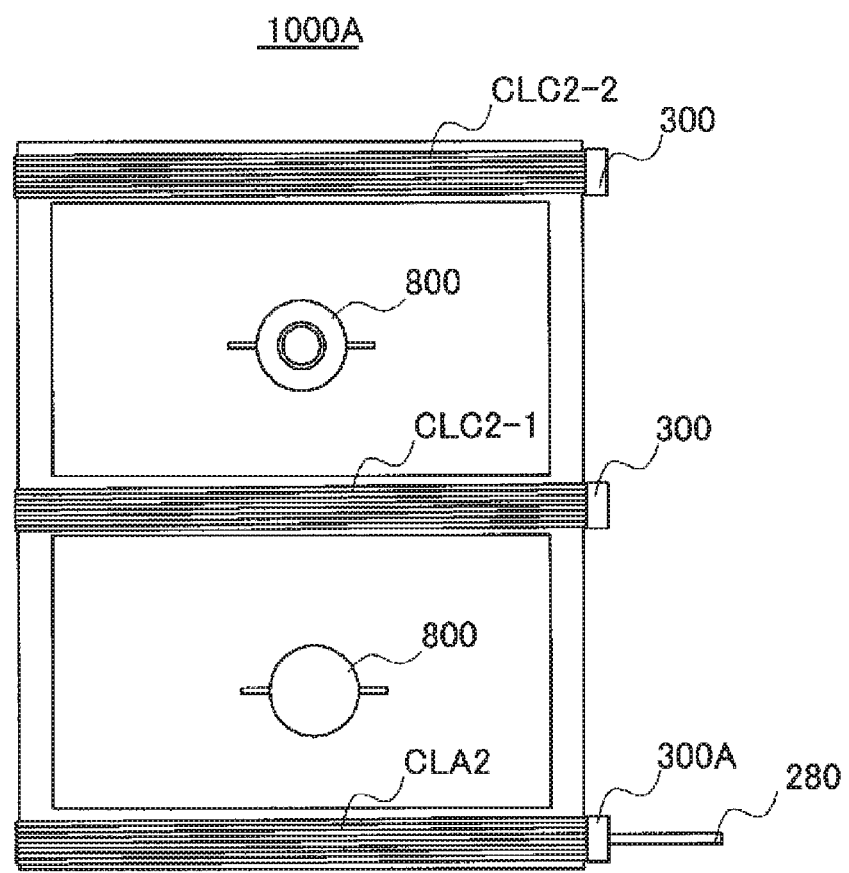
FIG. 12B is a front view illustrating the external appearance of the vertical type power supply stand using the helically wound coil.
Figure 12C:
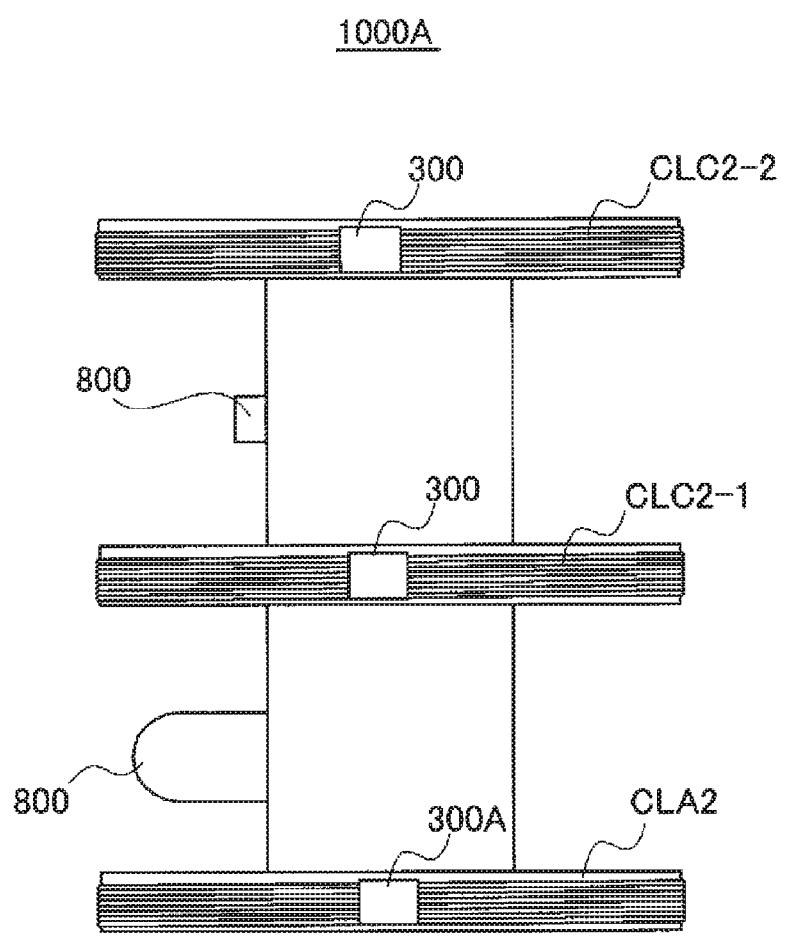
FIG. 12C is a side view illustrating the external appearance of the vertical type power supply stand using the helically wound coil.

FIG. 12A is a perspective view illustrating an external appearance of a vertical type power supply stand 1000A using a helically wound coil. FIG. 12B is a front view illustrating the external appearance of the vertical type power supply stand 1000A using the helically wound coil. FIG. 12C is a side view illustrating the external appearance of the vertical type power supply stand 1000A using the helically wound coil.

The power supply stand 1000A may be molded as a bobbin structure 1010A. In the bobbin structure 1010A, disc-shaped (thin column-shaped) bobbin bn13, bobbin bn14, and bobbin bn15 which are aligned with each other in the vertical (transmitting direction) are joined in connection members L11, L12, L13, and L14. The connection members L11, L12, L13, and L14 may be elongated members having an outer shape which is curved along a shape of a peripheral edge portion of the bobbin bn13, the bobbin bn14, and the bobbin bn15. The material of the connection member may be the same as the material of the bobbin described above, or the connection member may be integrally or separately molded. Alternatively, the connection member may be molded of a material different from that of the bobbin. As the connection member, fiber reinforced plastic (FRP) or corrosion resistant metal (for example, stainless steel) may be used. The bobbin structure 1010A may be molded by cutting out a portion of the side surface of the cylinder.

In the bobbin structure 1010A, the positional relationship is fixed among the bobbins bn13, bn14, and bn15. Therefore, the positional relationship is fixed among the power transmitting coil CLA2 located in the outer periphery of the bobbin bn13, the relay coil CLC2-1 located in the outer periphery of the bobbin bn14, and the relay coil CLC2-2 located in the outer periphery of the bobbin bn15. For example, there is no misalignment in the radial direction of the power transmitting coil CLA2 and the relay coils CLC2-1 and CLC2-2. In addition, since the inside is supported by the bobbin structure 1010A, the power transmitting coil CLA2 and the relay coils CLC2-1 and CLC2-2 are not deformed. In this manner, the power transmitting efficiency is also maintained in the vertical type power supply stand 1000A, similarly to a case of the horizontal type power supply stand 1000.

The relay box 300A to which the power cable 280 is connected is attached to the outer periphery of the power transmitting coil CLA2. Similarly, the relay boxes 300 are respectively attached to the outer peripheries of the relay coil CLC2-1 and the relay coil CLC2-2.

The bobbin bn13 and the bobbin bn14 which are supported in the vertical direction by the connection members L11 and L12 are widely open. Similarly, the bobbin bn14 and the bobbin bn15 which are supported in the vertical direction by the connection members L13 and L14 are widely open. Therefore, the underwater equipment such as the AUV 800 has a free access to the inside of the power supply stand 1000A.

The underwater equipment stays between the disc-shaped bobbin bn13 and bobbin bn14. In this manner, the power receiving coil CLB installed in the underwater equipment can receive the power from at least one of the power transmitting coil CLA2 and the relay coil CLC2-1. Similarly, the underwater equipment stays between the disc-shaped bobbin bn14 and bobbin bn15. In this manner, the power receiving coil CLB installed the underwater equipment can receive the power from at least one of the relay coils CLC2-1 and CLC2-2.

In this way, according to the power supply stand 1000A, a power receiving place is divided into two upper and lower stages in the power supply stand 1000A. Therefore, in a case where the plurality of underwater equipment receive the power at the same time, it is possible to select a place where the power is easily received. In addition, the inside of the power supply stand 1000A can also be used as a station (depot) or a hangar in which the underwater equipment temporarily stays. In addition, the bobbin structure 1010A can be reduced in weight by widening the space, compared to the bobbin bn11 of the power supply stand 1000.

It is assumed that the power supply stand 1000A is vertically placed. However, the power supply stand 1000A may be horizontally placed and used, depending on situations of the water currents or the tidal currents.

Figure 13A:
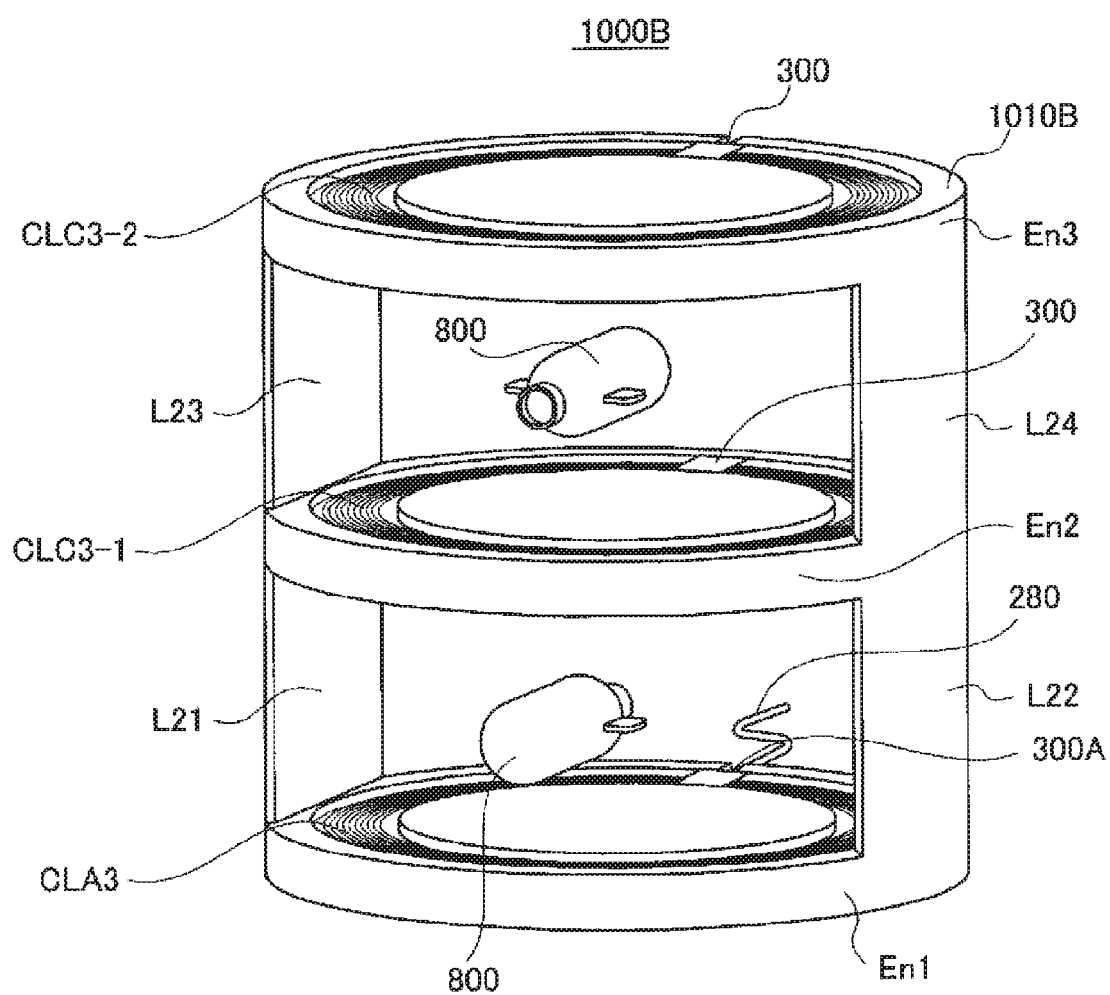
FIG. 13A is a perspective view illustrating the external appearance of the vertical type power supply stand using the spirally wound coil.
Figure 13B:
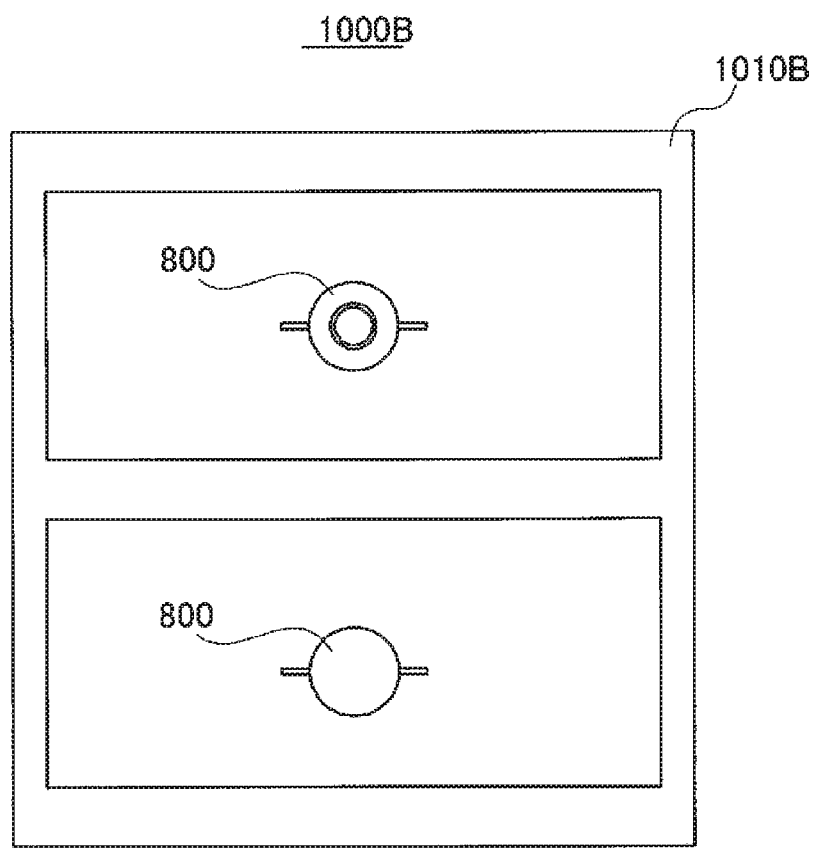
FIG. 13B is a front view illustrating the external appearance of the vertical type power supply stand using the spirally wound coil.
Figure 13C:
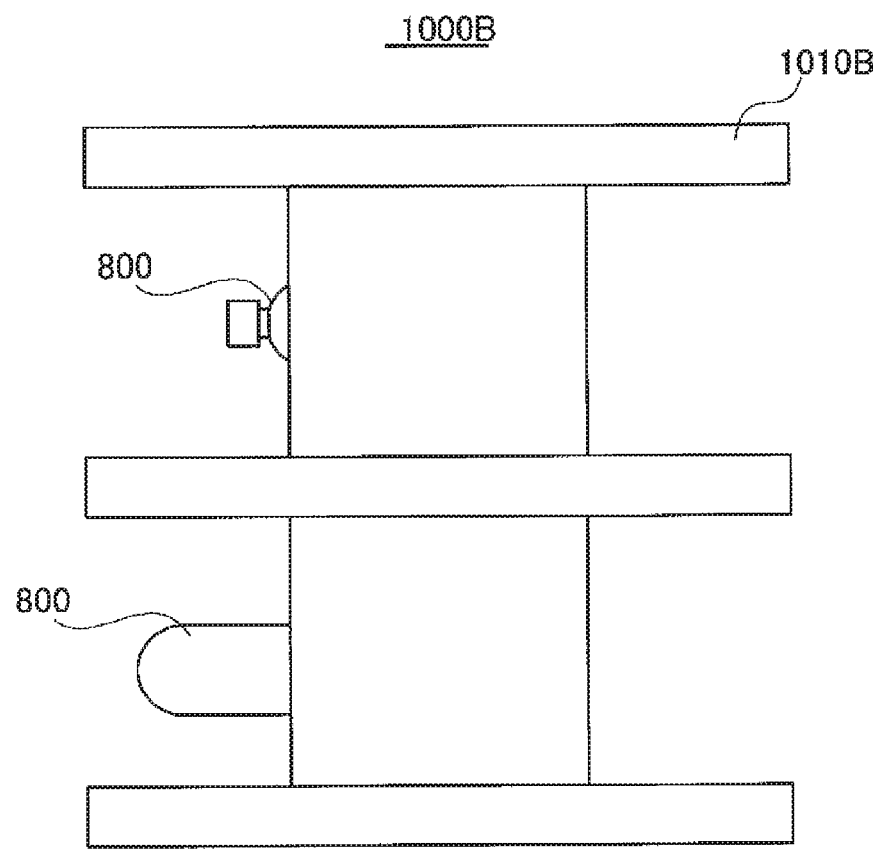
FIG. 13C is a side view illustrating the external appearance of the vertical type power supply stand using the spirally wound coil.

FIG. 13A is a perspective view illustrating an external appearance of a vertical type power supply stand 1000B using a spirally wound coil. FIG. 13B is a front view illustrating the external appearance of the vertical type power supply stand 1000B using the spirally wound coil. FIG. 13C is a side view illustrating the external appearance of the vertical type power supply stand 1000B using the spirally wound coil.

The power supply stand 1000B may be molded using a structure 1010B. In the structure 1010B, discs (thin column) En1, En2, and En3 which are aligned with each other in the vertical (transmitting direction) are joined in connection members L21, L22, L23, and L24. The respective discs En1, En2, and En3 may have an upper surface on which respective upper surface central portions are recessed from peripheral edge portions. A spirally wound power transmitting coil CLA3 and relay coils CLC3-1 and CLC3-2 may be fixed to the respective recessed supper surface central portions. The structure 1010B may be molded by cutting out a portion of the side surface of the cylinder.

In addition, the relay box 300 is located on the upper side of the spirally wound relay coils CLC3-1 and CLC3-2 in FIG. 13A. Similarly, the relay box 300A to which the power cable 280 is connected is located on the upper side of the spirally wound power transmitting coil CLA3 in FIG. 13A. In this manner, the relay boxes 300 and 300A do not protrude in an outer periphery direction of the structure 1010B.

In the power supply stand 1000B, similarly to the power supply stand 1000A, the power receiving place is divided into two upper and lower stages. Therefore, in a case where the plurality of underwater equipment receive the power at the same time, it is possible to select a place where the power is easily received. In addition, the inside of the power supply stand 1000B can also be used as a station (depot) or a hangar in which the underwater equipment temporarily stays. In addition, even in a case where the coil is less likely to be helically wound around the outer periphery of the cylindrical structure 1010B (for example, a space is insufficient in the radial direction of the cylinder), a support plate similar to the second support plate 703 supporting the coil CL1 illustrated in FIG. 9C is disposed on the lower surfaces of the respective coils such as the power transmitting coil CLA3 and the relay coils CLC3-1 and CLC3-2. The respective coils are supported from the lower surfaces. A rib similar to the rib 703y disposed in the second support plate 703 in FIG. 9C is disposed in the support plate. In this manner, the respective coils can be arranged by preventing the deformation of the respective coils.

In FIGS. 13A to 13C, the spirally wound power transmitting coil CLA3 and the relay coils CLC3-1 and CLC3-2 are exposed in the water. However, as illustrated in FIGS. 9A to 9C, the first support plate 701 and the second support plate 703 may pinch the spirally wound power transmitting coil CLA3 and the relay coils CLC3-1 and CLC3-2.

[Location Example of Power Receiving Coil CLB Installed in AUV 800]

Next, various location examples of the power receiving coil CLB installed in the AUV 800 will be described.

Figure 14A:
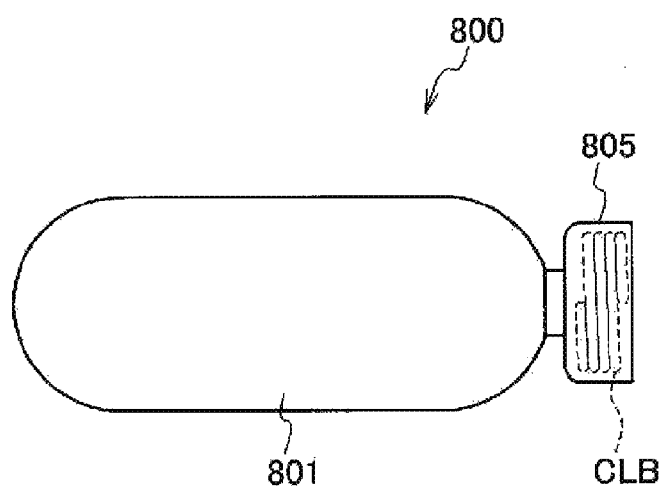
FIG. 14A is a front view illustrating an AUV in which a power receiving coil is located in a screw part.
Figure 14A:
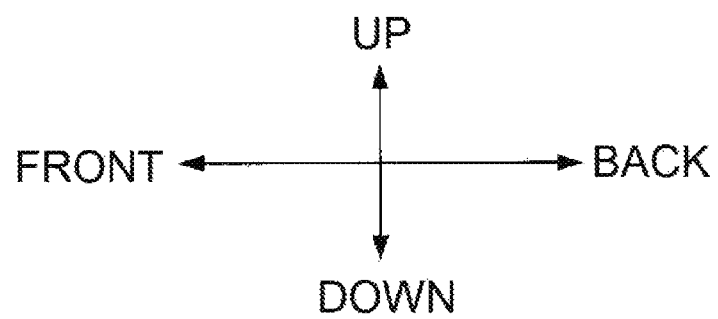
Figure 14B:
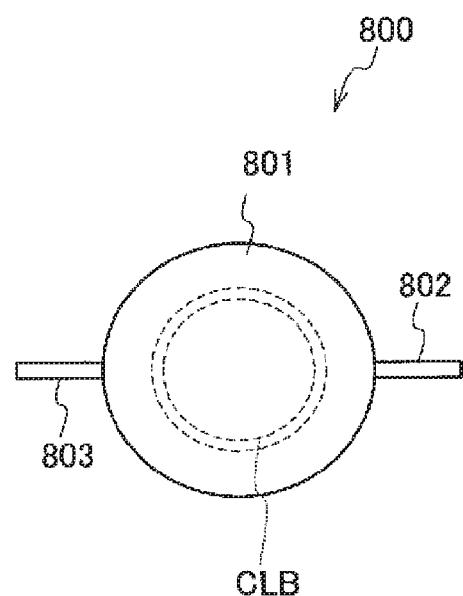
FIG. 14B is a side view illustrating the AUV in which the power receiving coil is located in the screw part.
Figure 14C:
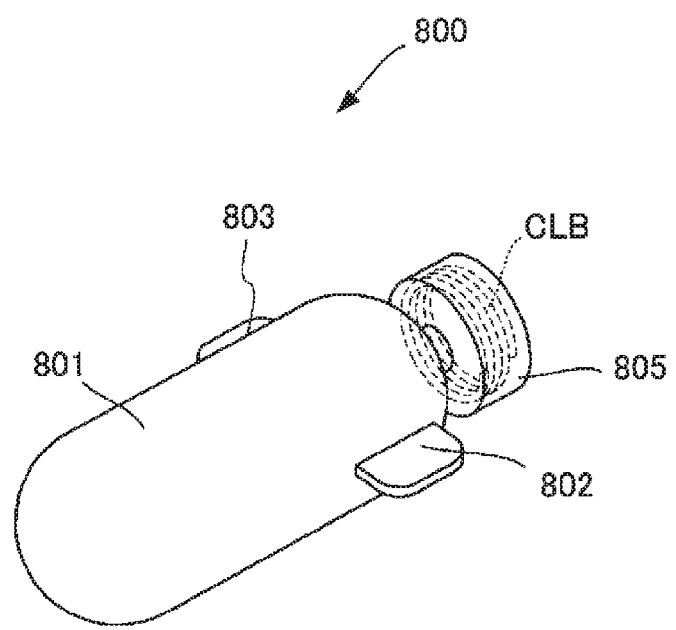
FIG. 14C is a perspective view illustrating the AUV in which the power receiving coil is located in the screw part.

FIG. 14A is a front view illustrating the AUV 800 in which the power receiving coil CLB is located in a screw part 805. FIG. 14B is a side view illustrating the AUV 800 in which the power receiving coil CLB is located in the screw part 805. FIG. 14C is a perspective view illustrating the AUV 800 in which the power receiving coil CLB is located in the screw part 805. A forward moving direction of the AUV 800 is set to a forward direction.

The AUV 800 is an underwater cruising machine capable of autonomous underwater cruising. The AUV 800 includes a substantially spindle-shaped body part 801, a pair of wing parts 802 and 803 disposed on both sides of the body part 801, and the screw part 805 disposed behind the body part 801. The screw part 805 has a cylindrical frame which covers a screw. The helical wound power receiving coil CLB is located inside a frame of the screw part 805 so that a central axis direction (underwater cruising direction) of the AUV 800 is set to the power transmitting direction. In a case where the power is received by the power receiving coil CLB, in the AUV 800, the screw part 805 may be located closer to the external coil CL.

In this way, the power receiving coil CLB is disposed in the screw part 805 located in the rear end of the AUV 800. Therefore, in a case where a camera is normally located in a front portion (for example, a front end) of the body part 801, when the camera images an object in the sea, the power receiving coil CLB is not included in an imaging range, and the imaging cannot be hindered. In addition, the screw is positioned in a hollow portion of the helically wound power receiving coil CLB. In this manner, it is possible to prevent the rotation of the screw from being hindered by the power receiving coil CLB. Furthermore, the power receiving coil CLB and the screw are coaxially arranged. In this manner, the AUV 800 can have a compact size only by preparing a space equivalent to the space required for the screw.

Figure 15A:
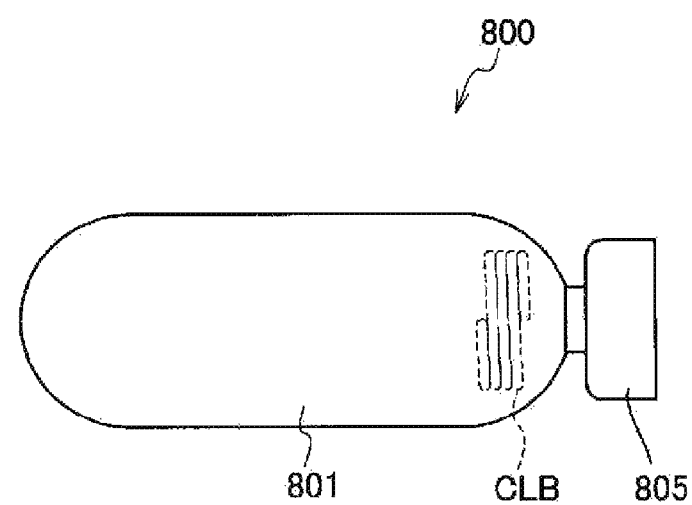
FIG. 15A is a front view illustrating an AUV in which a helically wound power receiving coil is located in a rear portion of a body part.
Figure 15A:
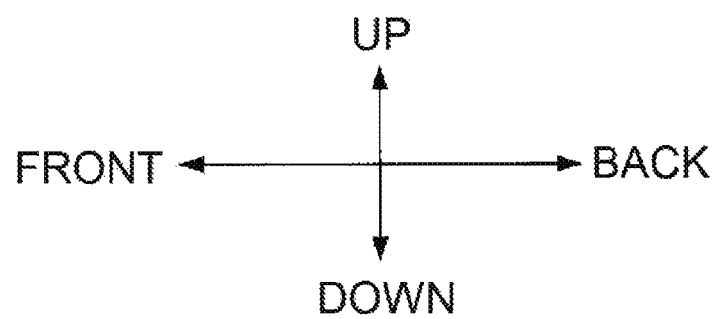
Figure 15B:
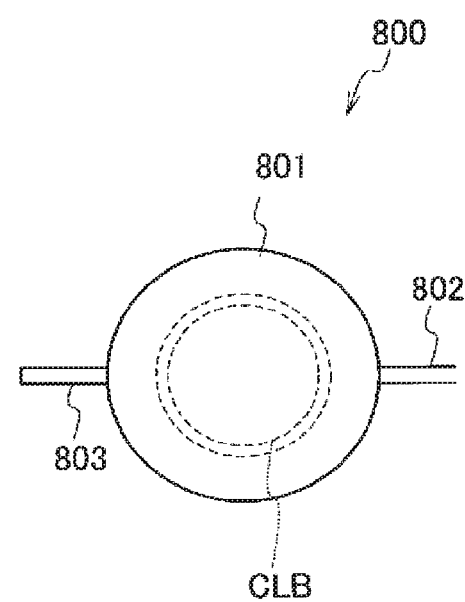
FIG. 15B is a side view illustrating the AUV in which the helically wound power receiving coil is located in the rear portion of the body part.
Figure 15C:
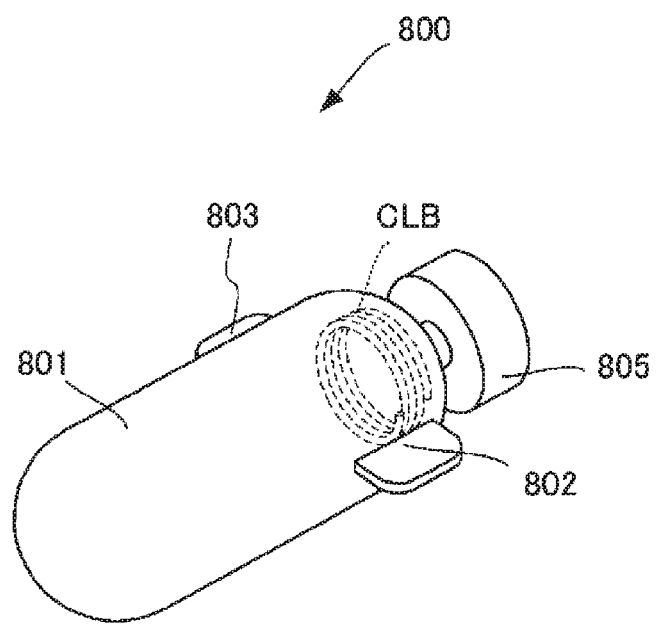
FIG. 15C is a perspective view illustrating the AUV in which the helically wound power receiving coil is located in the rear portion of the body part.

FIG. 15A is a front view illustrating the AUV 800 in which the helically wound power receiving coil CLB is located in the rear portion of the body part 801. FIG. 15B is a side view illustrating the AUV 800 in which the helically wound power receiving coil CLB is located in the rear portion of the body part 801. FIG. 15C is a perspective view illustrating the AUV 800 in which the helically wound power receiving coil CLB is located in the rear portion of the body part 801.

The helical wound power receiving coil CLB may be located in the rear portion (for example, a tail) of the body part 801 so that the central axis direction (underwater cruising direction) is set to the power transmitting direction. Even in this case, in a case where the camera is located in the front portion (for example, the front end) of the body part 801, when the camera images the object in the sea, the power receiving coil CLB is not included in the imaging range, and the imaging cannot be hindered. In addition, in a case where the power is received by the power receiving coil CLB, the screw part 805 may be located closer to the external coil CL in the AUV 800.

Figure 16A:
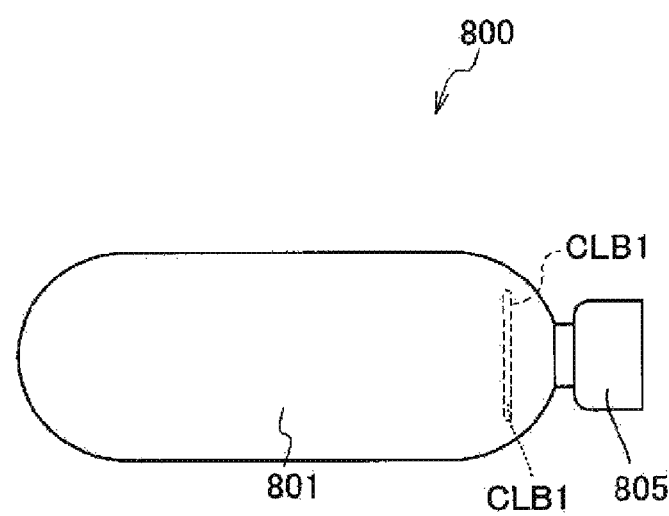
FIG. 16A is a front view illustrating an AUV in which a spirally wound power receiving coil is located in the rear portion of the body part.
Figure 16A:
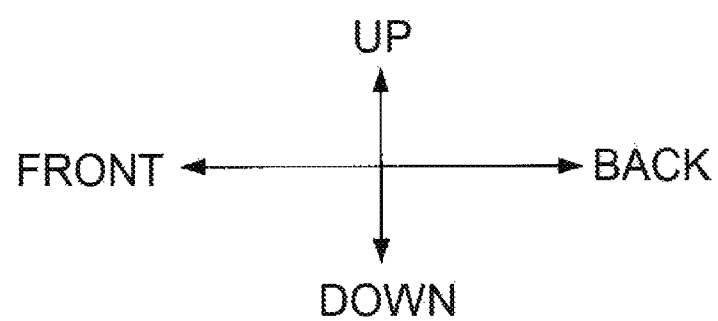
Figure 16B:
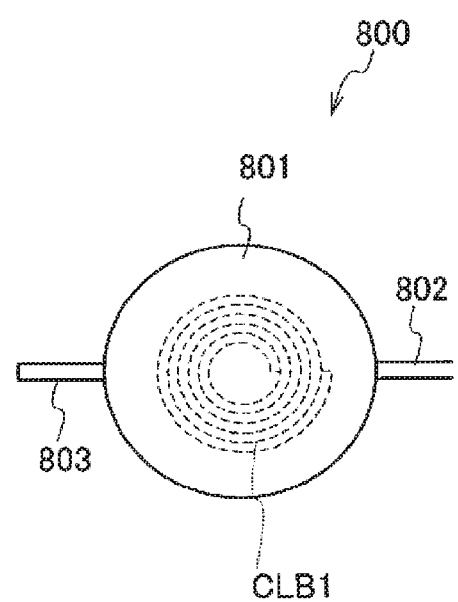
FIG. 16B is a side view illustrating the AUV in which the spirally wound power receiving coil is located in the rear portion of the body part.
Figure 16C:
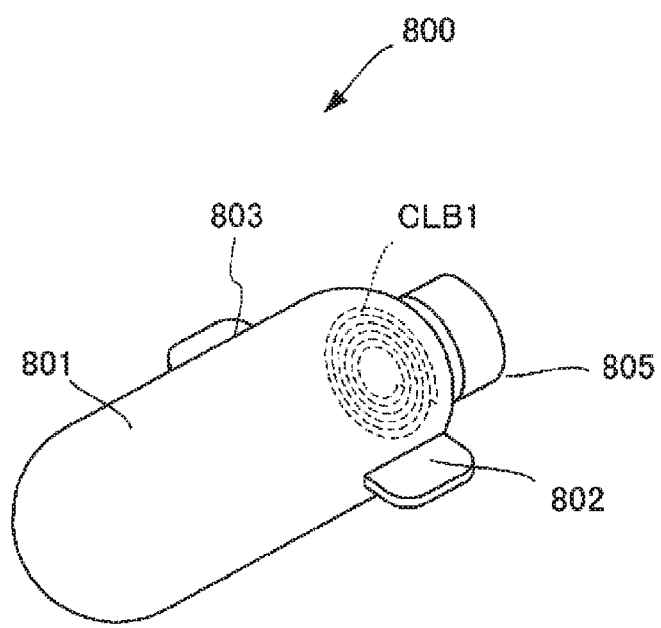
FIG. 16C is a perspective view illustrating the AUV in which the spirally wound power receiving coil is located in the rear portion of the body part.

FIG. 16A is a front view illustrating the AUV 800 in which the spirally wound power receiving coil CLB1 is located in the rear portion of the body part 801. FIG. 16B is a side view illustrating the AUV 800 in which the spirally wound power receiving coil CLB1 is located in the rear portion of the body part 801. FIG. 16C is a perspective view illustrating the AUV 800 in which the spirally wound power receiving coil CLB1 is located in the rear portion of the body part 801.

The spirally wound power receiving coil CLB1 may be located in the rear portion (for example, the tail) of the body part 801 so that the central axis direction (underwater cruising direction) is set to the power transmitting direction. Even in this case, in a case where the camera is located in the front portion of the body part 801, when the camera images the object in the sea, the power receiving coil CLB is not included in the imaging range, and the imaging cannot be hindered. In addition, in a case where the power is received by the power receiving coil CLB, the screw part 805 may be located closer to the external coil CL in the AUV 800.

Figure 17A:
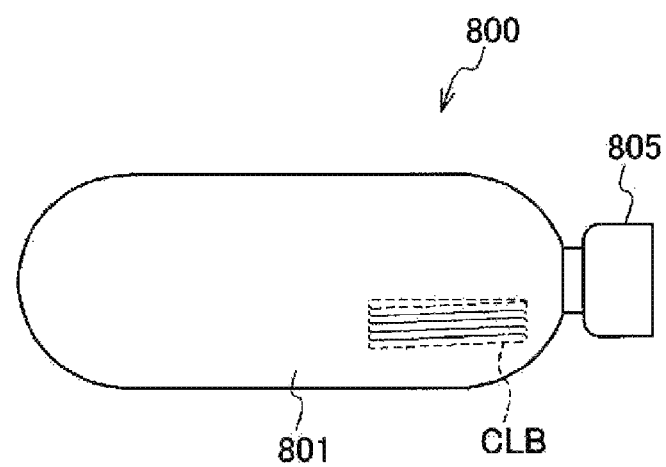
FIG. 17A is a front view illustrating an AUV in which a helically wound power receiving coil is located along a direction perpendicular to a front-back direction in the rear portion of the body part.
Figure 17A:
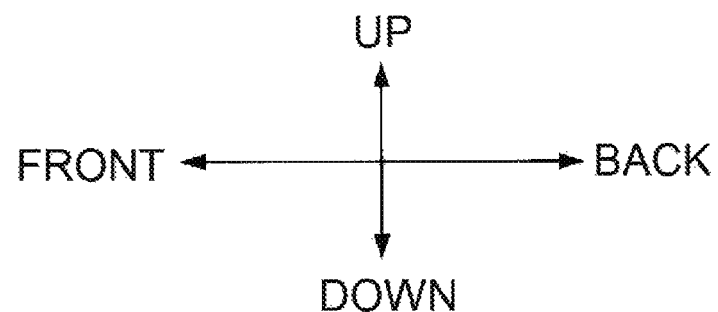
Figure 17B:
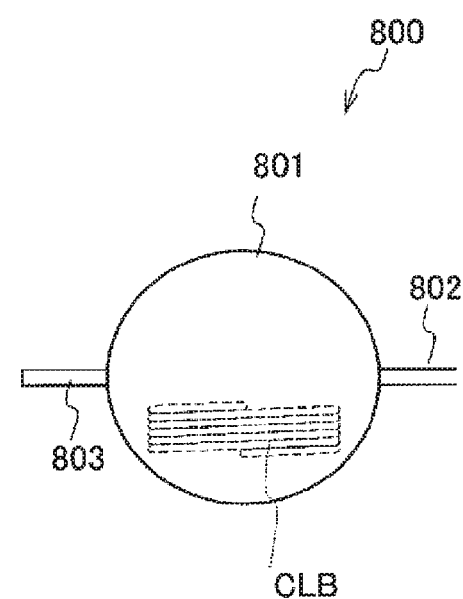
FIG. 17B is a side view illustrating the AUV in which the helically wound power receiving coil is located along the direction perpendicular to the front-back direction in the rear portion of the body part.
Figure 17C:
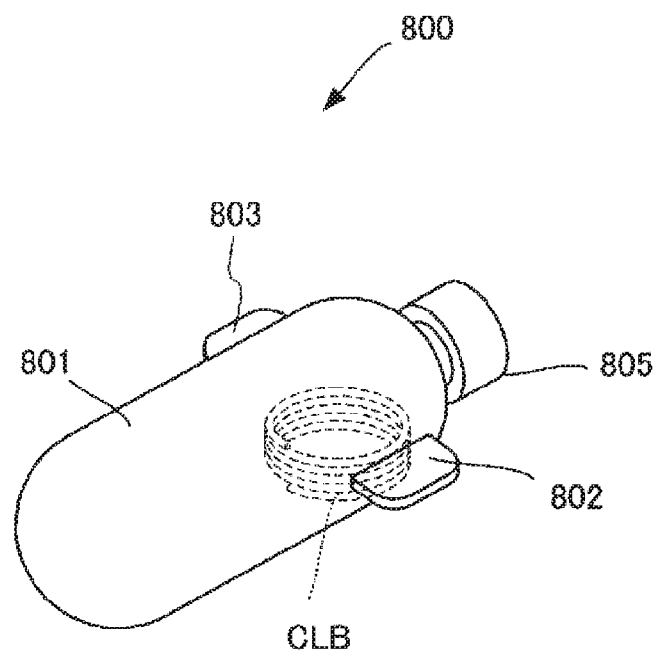
FIG. 17C is a perspective view illustrating the AUV in which the helically wound power receiving coil is located along the direction perpendicular to the front-back direction in the rear portion of the body part.

FIG. 17A is a front view illustrating the AUV 800 in which the helically wound power receiving coil CLB is located along a direction perpendicular to the front-back direction (up-down direction) in the rear portion of the body part 801. FIG. 17B is a side view illustrating the AUV 800 in which the helically wound power receiving coil CLB is located along the direction perpendicular to the front-back direction (up-down direction) in the rear portion of the body part 801. FIG. 17C is a perspective view illustrating the AUV 800 in which the helically wound power receiving coil CLB is located along the direction perpendicular to the front-back direction (up-down direction) in the rear portion of the body part 801.

The helically wound power receiving coil CLB may be located in the rear portion (for example, the tail) of the body part 801 so that the direction (up-down direction) orthogonal to the central axis direction (underwater cruising direction) of the AUV 800 is set to the power transmitting direction. Even in this case, in a case where the camera is located in the front portion of the body part 801, when the camera images the object in the sea, the power receiving coil CLB is not included in the imaging range, and the imaging cannot be hindered. In addition, in a case where the power is received by the power receiving coil CLB, the lower surface of the body part 801 may be located closer to the external coil CL in the AUV 800.

Figure 18A:
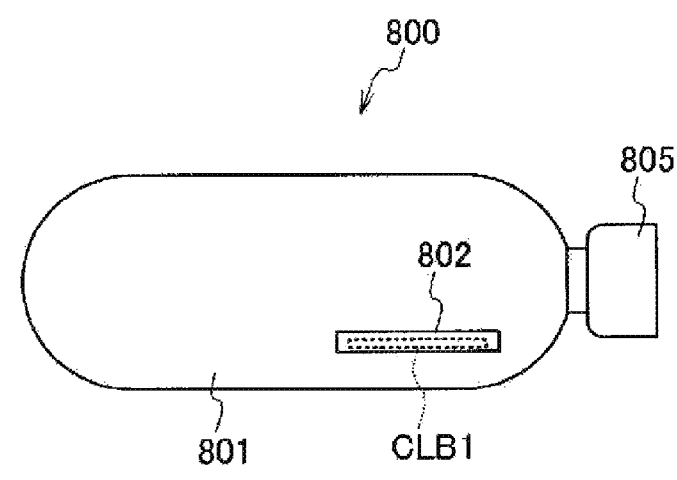
FIG. 18A is a front view illustrating an AUV in which a spirally wound power receiving coil is located on a lower surface of a wing part projecting from the body part.
Figure 18A:
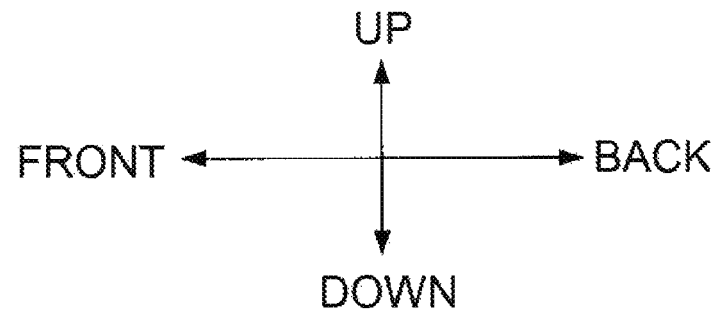
Figure 18B:
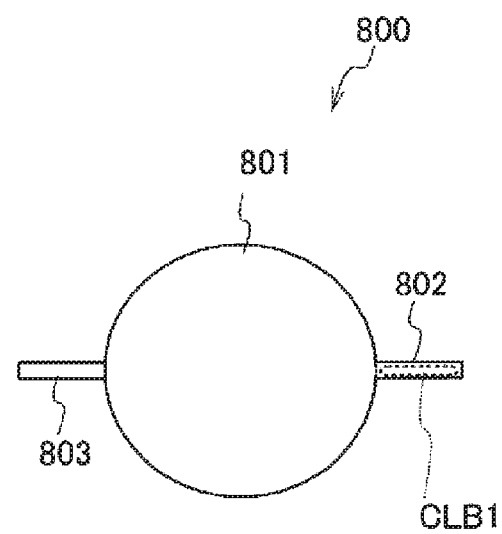
FIG. 18B is a side view illustrating the AUV in which the spirally wound power receiving coil is located on the lower surface of the wing part projecting from the body part.
Figure 18C:
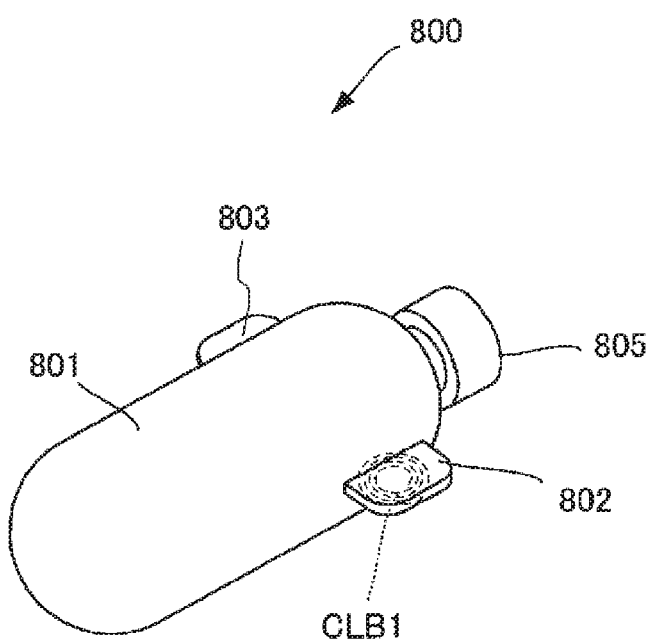
FIG. 18C is a perspective view illustrating the AUV in which the spirally wound power receiving coil is located on the lower surface of the wing part projecting from the body part.

FIG. 18A is a front view illustrating the AUV 800 in which the spirally wound power receiving coil CLB1 is located on the lower surface of a pair of wing parts 802 and 803 projecting from the body part 801. FIG. 18B is a side view illustrating the AUV 800 in which the spirally wound power receiving coil CLB1 is located on the lower surface of a pair of wing parts 802 and 803 projecting from the body part 801. FIG. 18C is a perspective view illustrating the AUV 800 in which the spirally wound power receiving coil CLB1 is located on the lower surface of a pair of wing parts 802 and 803 projecting from the body part 801. The power receiving coil CLB1 may be located on both the wing parts 802 and 803, or may be located on any one of the wing parts 802 and 803.

The spirally wound power receiving coil CLB1 may be located on the lower surface of the wing parts 802 and 803 projecting from the body part 801 so that the direction (up-down direction) orthogonal to the central axis direction (underwater cruising direction) of the AUV 800 is set to the power transmitting direction. Even in this case, in a case where the camera is located in the front portion (for example, the front end) of the body part 801, when the camera images the object in the sea, the power receiving coil CLB is not included in the imaging range, and the imaging cannot be hindered. In addition, in a case where the power is received by the power receiving coil CLB1, in the AUV 800, the lower surface of the wing parts 802 and 803 may be located closer to the external coil CL.

In addition, in a case where the power receiving coil CLB1 is located on both the lower surfaces of the wing parts 802 and 803, the right and left balanced gravity is maintained. In this case, the underwater cruising of the AUV 800 can be prevented from being hindered due to the right and left unbalanced gravity. Here, the rightward-leftward direction may be a direction for connecting the pair of wing parts 802 and 803. In addition, even if one power receiving coil CLB1 fails, the other power receiving coil CLB1 can receive the power. Therefore, a situation is less likely to occur where the power receiving coil CLB1 cannot receive the power, and one of the power receiving coils CLB1 can be used as a backup. In addition, in a case where the power receiving coil CLB1 is located on any one lower surface of the pair of wing parts 802 and 803, the cost can be reduced.

Instead of spirally wound power receiving coil, the helically wound power receiving coil CLB may be disposed in at least one of the wing parts 802 and 803.

Figure 19A:
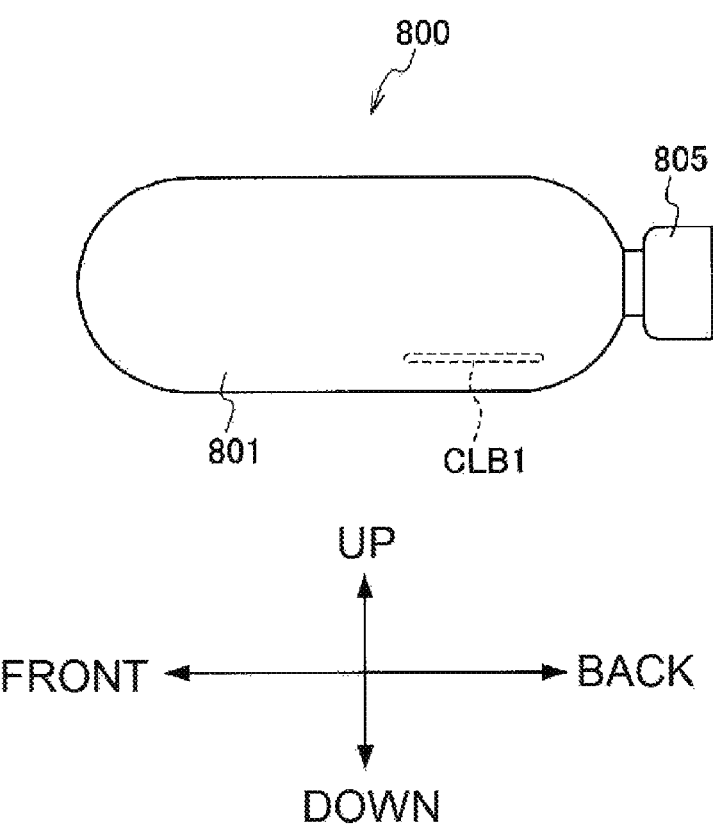
FIG. 19A is a front view illustrating an AUV in which the spirally wound power receiving coil is located along the direction perpendicular to the front-back direction in the rear portion of the body part.
Figure 19B:
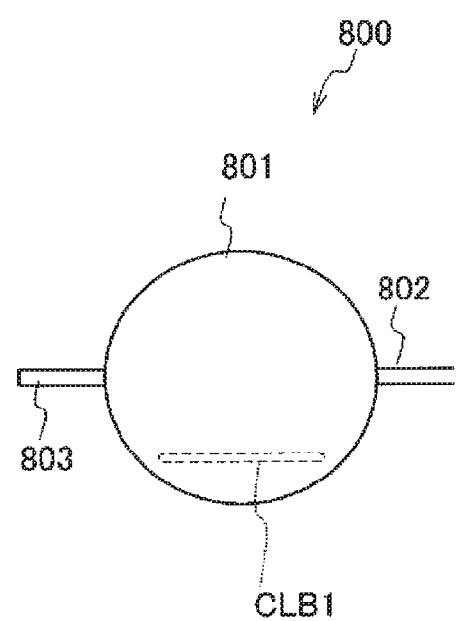
FIG. 19B is a side view illustrating the AUV in which the spirally wound power receiving coil is located along the direction perpendicular to the front-back direction in the rear portion of the body part.
Figure 19C:
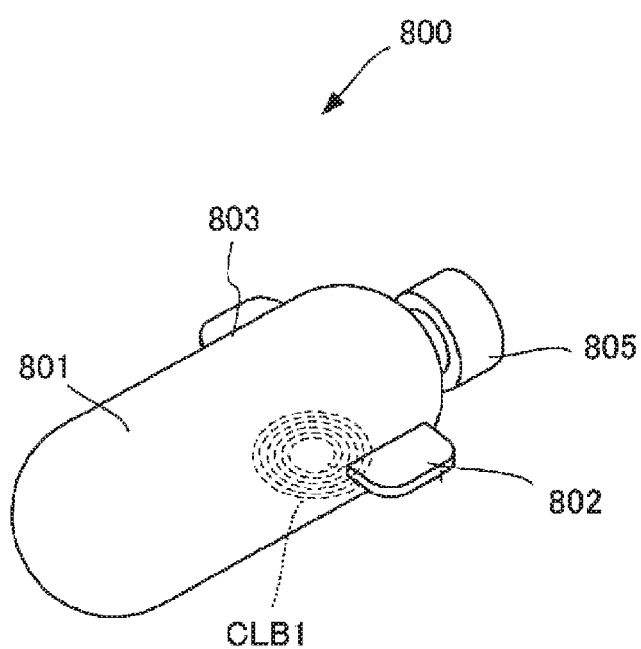
FIG. 19C is a perspective view illustrating the AUV in which the spirally wound power receiving coil is located along the direction perpendicular to the front-back direction in the rear portion of the body part.

FIG. 19A is a front view illustrating the AUV 800 in which the spirally wound power receiving coil CLB1 is located along the direction (up-down direction) perpendicular to the front-back direction in the rear portion of the body part 801. FIG. 19B is a side view illustrating the AUV 800 in which the spirally wound power receiving coil CLB1 is located along the direction (up-down direction) perpendicular to the front-back direction in the rear portion of the body part 801. FIG. 19C is a perspective view illustrating the AUV 800 in which the spirally wound power receiving coil CLB1 is located along the direction (up-down direction) perpendicular to the front-back direction in the rear portion of the body part 801.

The spirally wound power receiving coil CLB1 may be located in the rear portion (for example, the tail) of the body part 801 so that the direction (up-down direction) perpendicular to the central axis direction (underwater cruising direction) of the AUV 800 is set to the power transmitting direction. Even in this case, in a case where the camera is located in the front portion (for example, the front end) of the body part 801, when the camera images the object in the sea, the power receiving coil CLB is not included in the imaging range, and the imaging cannot be hindered. In addition, in a case where the power is received by the power receiving coil CLB1, the lower surface of the body part 801 may be located closer to the external coil CL in the AUV 800.

In this way, in a case where the power receiving coils CLB and CLB1 are disposed in the rear portion of the AUV 800, the camera or various sensors can be located in the front portion of the AUV 800, and a space inside the AUV 800 can be effectively utilized. The camera may image a forward existing object. For example, various sensors may include a measurement sensor for detecting the forward existing object or for measuring a distance to the forward existing object.

In addition, the power receiving coils CLB and CLB1 are arranged inside the AUV 800. In this manner, the power receiving coils CLB and CLB1 can be prevented from coming into direct contact with the water (for example, fresh water or seawater). Accordingly, the power receiving device 200 can prevent a magnetic field generated by the AC current flowing in the power receiving coil CLB from leaking into the water. In addition, the power receiving device 200 can prevent dielectric loss caused by the water. Therefore, the power receiving device 200) can prevent a decrease in the power transmitting efficiency via the magnetic field in a case where the power receiving coils CLB and CLB1 are used.

In addition, the power receiving coils CLB and CLB1 may be arranged in the central portion of the body part 801 of the AUV 800. The body part 801 may be formed to contain metal. Even in this case, the power transmitting device 100 can secure a long distance as much as possible between an outer edge including the metal portion of the body part 801 and the power receiving coils CLB and CLB1. Therefore, the power receiving device 200 can prevent the magnetic field generated by the current flowing through the power receiving coils CLB and CLB1 or the external coil CL (for example, the power transmitting coil CLA or the relay coil CLC) from being reduced due to the metal portion of the body part 801.

In addition, in a case where a distance is close between the power receiving coils CLB and CLB1 and seawater, the power loss is likely to occur due to an eddy current in seawater. In contrast, in a case where the power receiving coils CLB and CLB1 are arranged in the central portion of the body part 801, the power receiving device 200 can secure a longer distance from the water (for example, the seawater) to the power receiving coils CLB and CLB1, compared to a case where both of these are arranged in other locations inside the body part 801. Accordingly, the power loss caused by the eddy current in the seawater can be reduced.

The arrangement of the power receiving coil CLB installed in the AUV 800 may be appropriately determined, depending on a positional relationship with the power transmitting coil CLA or a shape of underwater cruising destination of the AUV 800.

[Various Aspects of Underwater Power Supply]

Next, variations in various aspects of the underwater power supply will be described.

(First Aspect of Underwater Power Supply)

Figure 20:
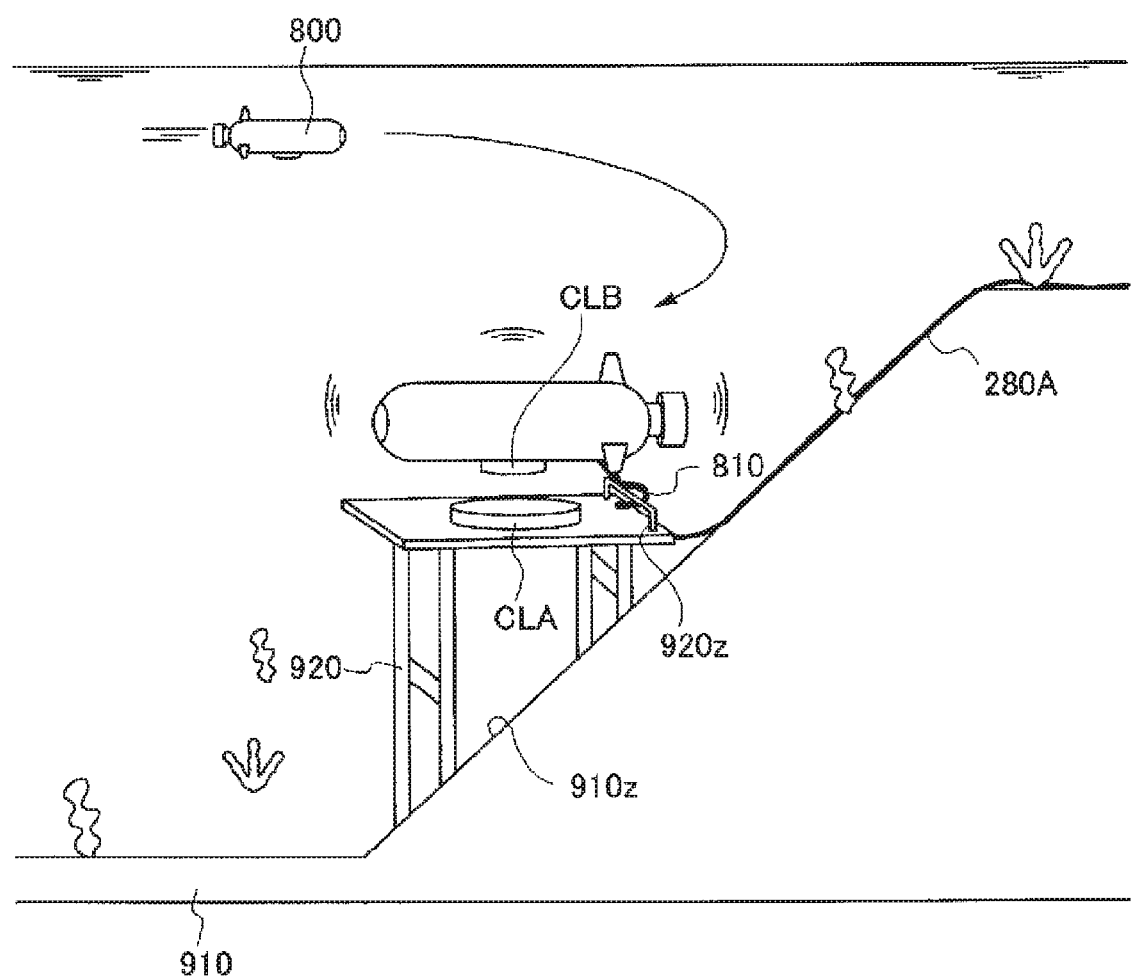
FIG. 20 is a diagram illustrating a first aspect of underwater power supply.

FIG. 20 is a diagram illustrating a first aspect of the underwater power supply. A base frame 920 is installed on a slope 910z where a sea bottom 910 is raised. A structure of the power transmitting coil CLA is installed on a top plate of the base frame 920. For example, a U-shaped bar frame 920z is attached to one end portion of the top plate of the base frame 920. The bar frame 920z engages with a position fixing hook 810 connected to the AUV 800. In addition, the power is supplied to the power transmitting coil CLA via the power cable 280A connected to the relay box 300A, similarly to the power transmitting coil CLA illustrated in FIG. 3, for example.

For example, the structure of the power transmitting coil CLA may be the bobbin or the coil helically wound around the bobbin structure as described above, or the spirally wound coil pinched by the first support plate 701 and the second support plate 703. Alternatively, the structure may be a coil formed in other shapes. The same applies to the structure of the power receiving coil CLB and the structure of the relay coil CLC. The structure of the power receiving coil CLB may be attached to an exterior (for example, a lower portion of the body part 801) of the AUV 800, or may be attached to an interior of the AUV 800. These configurations are the same as those in each aspect of the underwater power supply.

When receiving the power, the AUV 800 performs underwater cruising toward the base frame 920. If the position fixing hook 810 engages with the bar frame 920z, the AUV 800 stays above the base frame 920. In a state where the AUV 800 stays above the base frame 920, the structure of the power receiving coil CLB located below the body part 801 of the AUV 800 faces the structure of the power transmitting coil CLA. In this state, if the power is supplied from the power cable 280A to the power transmitting coil CLA, the power is transmitted from the power transmitting coil CLA to the power receiving coil CLB.

If the underwater power supply is completely performed, the AUV 800 releases the position fixing hook 810 from the bar frame 920z. In this case, the AUV 800 may be moved rearward so that the position fixing hook 810 is detached from the bar frame 920z. Thereafter, the AUV 800 is capable of free underwater cruising.

If the structure of the power receiving coil CLB is moved or rotated due to the tidal currents, there is a possibility that the power receiving efficiency may decrease. According to the first aspect, the power transmitting system 10 can stabilize the position of the structure of the power receiving coil CLB by using the position fixing hook 810, even if there are the tidal currents. The power receiving device 200 can prevent a decrease in the power receiving efficiency by stabilizing the position of the structure of the power receiving coil CLB.

Figure 21:
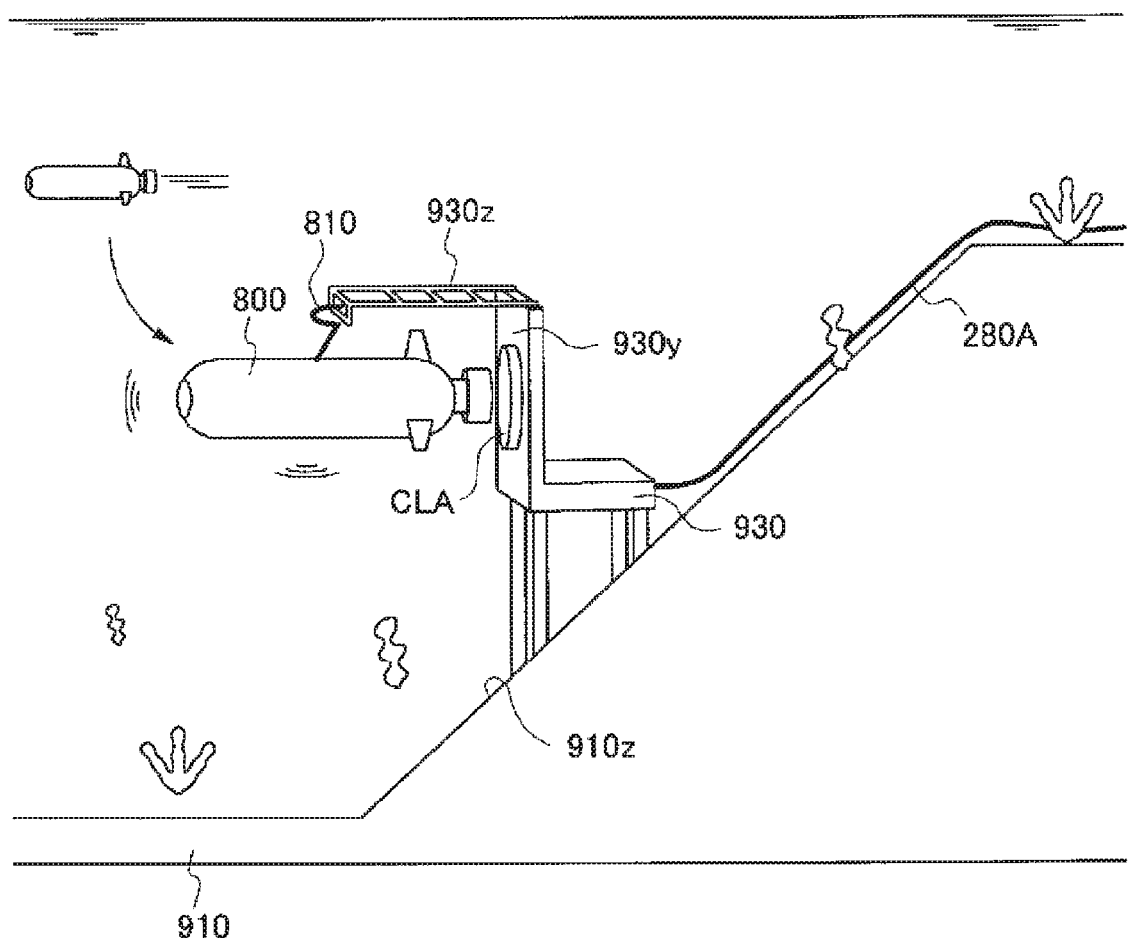
FIG. 21 is a diagram illustrating a second aspect of underwater power supply.

FIG. 21 is a diagram illustrating a second aspect of the underwater power supply. Similarly to the first aspect, the base frame 930 is installed on the slope 910z where the sea bottom 910 is raised. A lateral plate 930y is attached to a corner portion of the top plate of the base frame 930 so that the lateral plate 930y is combined with the top plate to form an L-shape. The structure of the power transmitting coil CLA is installed on an outer surface of the lateral plate 930y. A bar frame 930z which extends mainly in the horizontal direction and with which the position fixing hook 810 can engage is attached to an upper portion of the lateral plate 930y.

While the AUV 800 performs the underwater cruising toward the base frame 930 and moves rearward in front of the base frame 930, the position fixing hook 810 connected to the body part 801 may engage with the bar frame 930z. If the position fixing hook 810 engages with the bar frame 930z, the AUV 800 stays in a state where the power receiving coil CLB located in the screw part 805 faces the structure of the power transmitting coil CLA located in the lateral plate 930y. In this state, if the power is supplied to the power cable 280A, the power is transmitted from the power transmitting coil CLA to the power receiving coil CLB.

If the underwater power supply is completely performed, the AUV 800 releases the position fixing hook 810 from the bar frame 930z. In this case, the AUV 800 may be moved forward so that the position fixing hook 810 is detached from the bar frame 930z. Thereafter, the AUV 800 is capable of free underwater cruising.

According to the second aspect, the power transmitting system 10 can stabilize the position of the structure of the power receiving coil CLB by using the position fixing hook 810, even if there are the tidal currents. The power receiving device 200 can prevent a decrease in the power receiving efficiency by stabilizing the position of the structure of the power receiving coil CLB.

Figure 22:
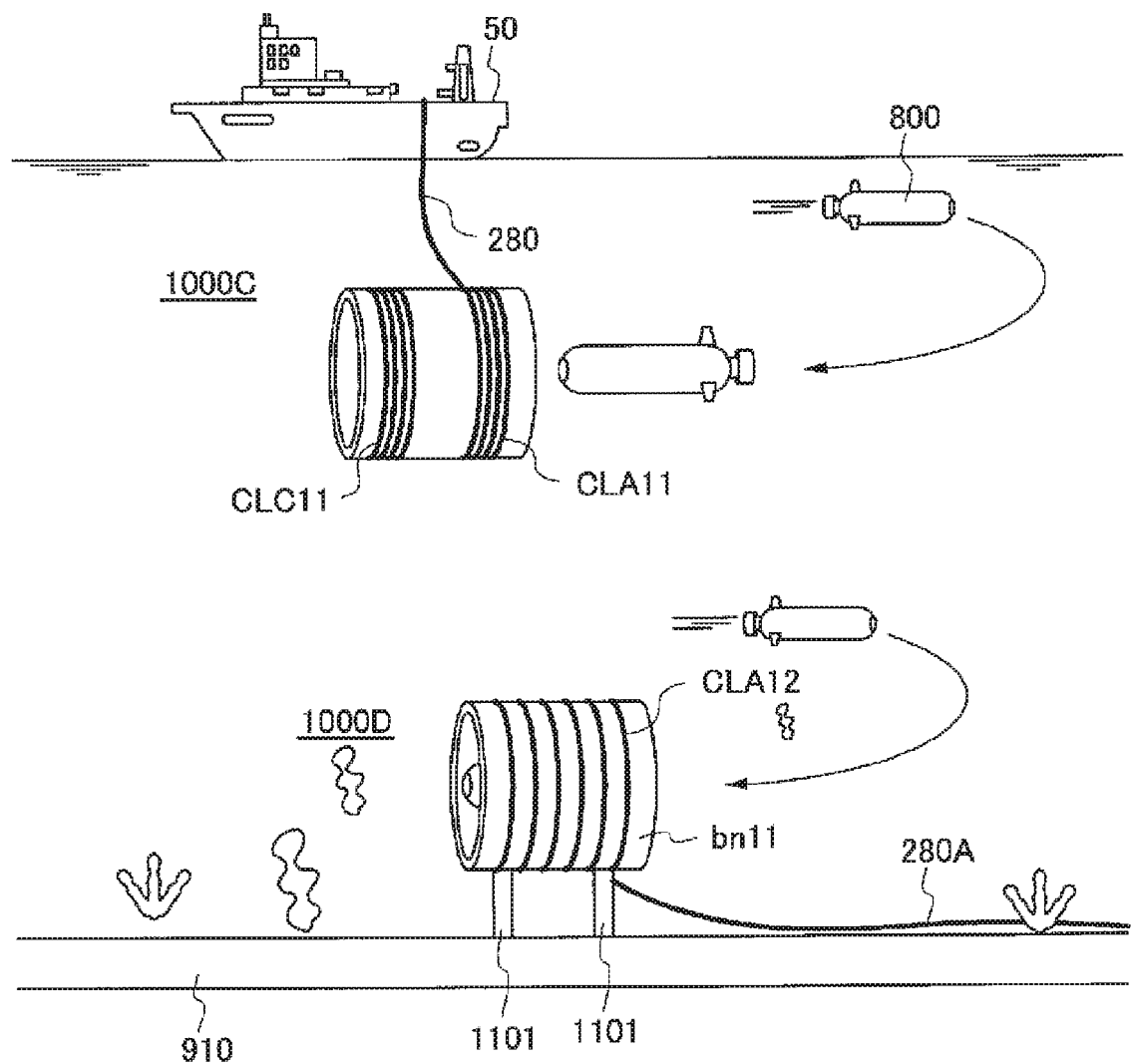
FIG. 22 is a diagram illustrating a third aspect of underwater power supply.

FIG. 22 is a diagram illustrating a third aspect of the underwater power supply. In the third aspect, the underwater power supply may be performed using two power supply stand 1000C and power supply stand 1000D. The power supply stand 1000C and the power supply stand 1000D include the cylindrical bobbin bn11, similarly to the power supply stand 1000 including the cylindrical bobbin bn11 described above.

In the power supply stand 1000C, a power transmitting coil CLA11 and a relay coil CLC11 are arranged by being wound around the outer periphery of the cylindrical bobbin bn11. The power cable 280 is connected to the power transmitting coil CLA11, and the power is supplied from the ship 50 moored on the sea via the power cable 280. The power cable 280 supports the power supply stand 1000C in a floating state in the sea. In the floating state, openings on both sides of the cylindrical bobbin bn11 may face the horizontal direction. The AUV 800 may enter an entrance/exit of the power supply stand 1000C in the floating state in the horizontal direction, and may stay inside the bobbin bn11 to receive the power.

The power supply stand 1000D is fixed to an upper portion of two columns 1101 embedded in the sea bottom 910. The entrance/exit of the power supply stand 1000D may face the horizontal direction. In the power supply stand 1000D, a power transmitting coil CLA12 may be located by being wound around the cylindrical bobbin bn11, and the relay coil CLC may not be located. A power cable 280A leading to the sea bottom 910 may be connected to the power transmitting coil CLA12, and the power may be supplied from a power supply facility installed on land via the power cable 280A. The AUV 800 may enter the entrance/exit of the power supply stand 1000D installed on the sea bottom 910 in the horizontal direction, and may stay inside the bobbin bn11 to receive the power.

According to the third aspect, the power transmitting coil CLA can be located in a movement destination of the ship 50. Accordingly, in the power transmitting system 10, a charging place used by the power transmitting coil CLA and the power receiving coil CLB can be installed in any desired place. Any one installation of the power supply stands 1000C and 1000D may be omitted. In addition, even in a case where the power transmitting coil CLA is installed so that the position is fixed, the power transmitting system 10 can transmit the power to the power receiving coil CLB of the AUV 800 illustrated in FIGS. 14A to 14C and 15A to 15C or FIGS. 17A to 17C.

Figure 23:
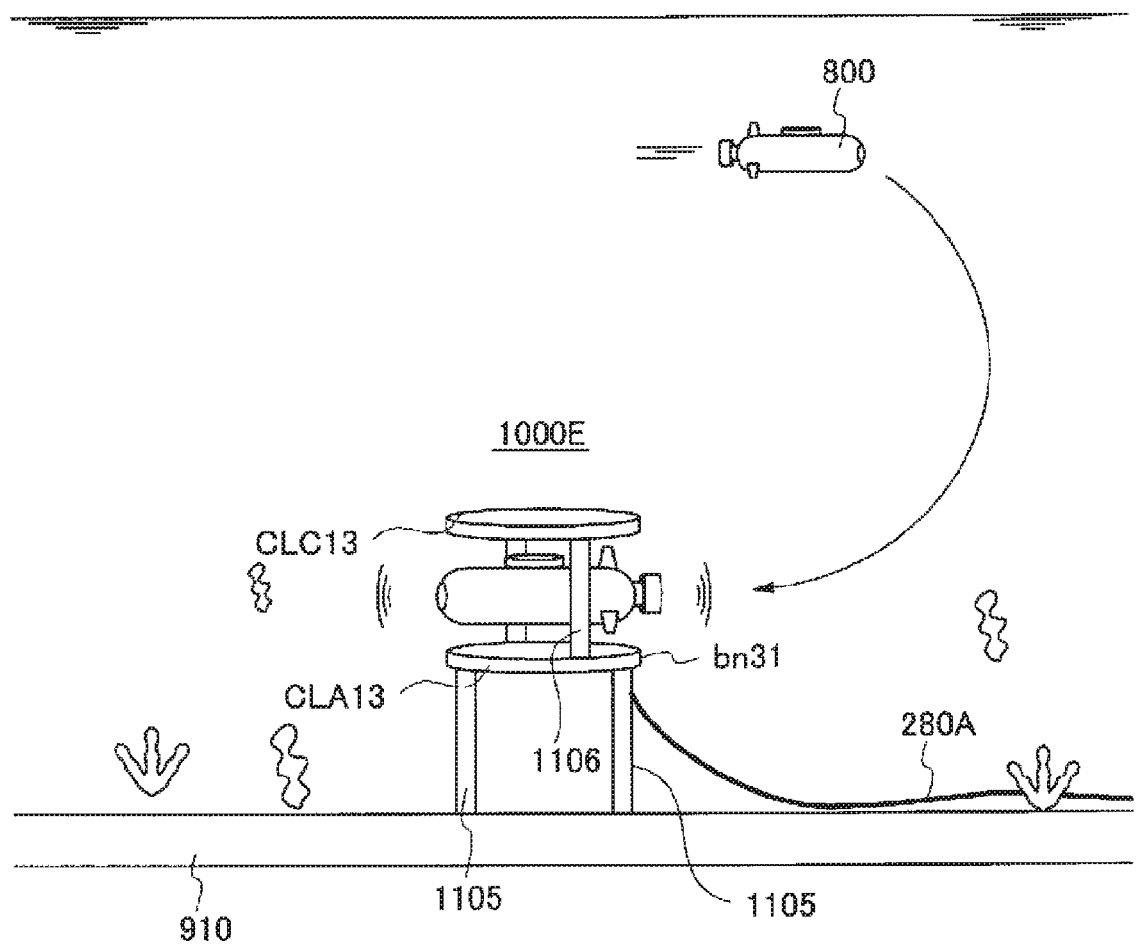
FIG. 23 is a diagram illustrating a fourth aspect of underwater power supply.

FIG. 23 is a diagram illustrating a fourth aspect of the underwater power supply. In a power supply stand 1000E, a structure of a power transmitting coil CLA13 is fixed to an upper portion of a column 1105 installed on the sea bottom 910. A column 1106 is attached to the upper surface of the structure of the power transmitting coil CLA13 so as to face upward. A structure of a relay coil CLC13 is fixed to the upper portion of the two columns 1106. The power transmitting coil CLA13 and the relay coil CLC13 are fixed to face each other. In the power supply stand 1000E, the entrance/exit of the AUV 800 is located between the two columns 1106.

The power cable 280A leading to the sea bottom 910 may be connected to the power transmitting coil CLA13, and the power may be supplied from a power supply facility installed on land via the power cable 280A. The AUV 800 may enter the entrance/exit of the power supply stand 1000E installed on the sea bottom 910 in the horizontal direction, and may stay to receive the power between the power transmitting coil CLA13 and the relay coil CLC13 which face each other.

In addition, even in a case where the power transmitting coil CLA13 is installed so that the position is fixed, the power transmitting system 10 can transmit the power to the power receiving coil CLB of the AUV 800 illustrated in FIGS. 17A to 17C or the power receiving coil CLB1 of the AUV 800 illustrated in FIGS. 18A to 18C and 19A to 19C.

Figure 24:
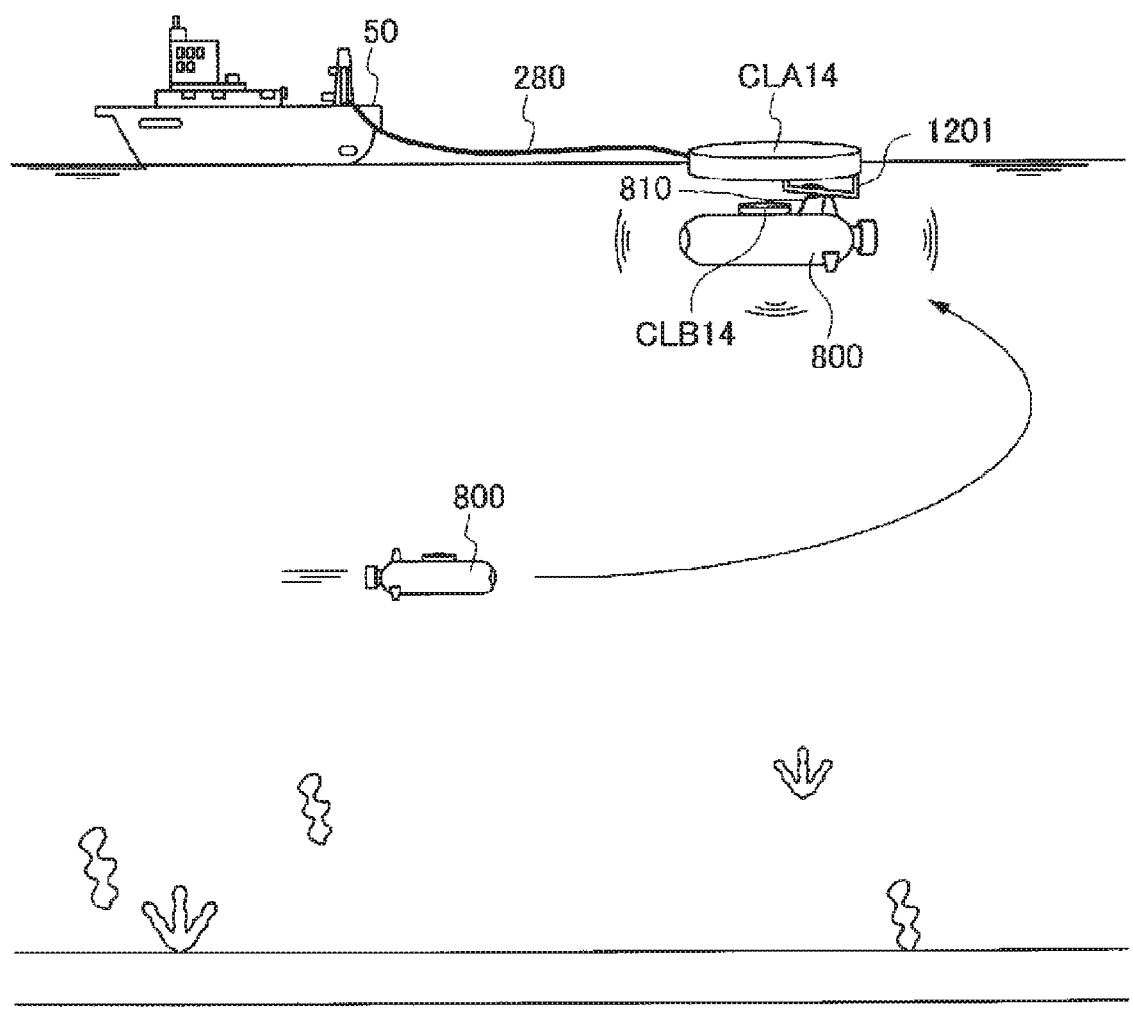
FIG. 24 is a diagram illustrating a fifth aspect of underwater power supply.

FIG. 24 is a diagram illustrating a fifth aspect of the underwater power supply. In the fifth aspect, a structure of a power transmitting coil CLA14 floats on the sea. A U-shaped bar frame 1201 may be attached to the lower surface of the structure of the disc-shaped power transmitting coil CLA14.

The power cable 280 extending from the ship 50 moored on the sea is connected to the structure of the power transmitting coil CLA14. The power is supplied to the power transmitting coil CLA14 via the power cable 280.

A power receiving coil CLB14 and the position fixing hook 810 are attached to the body part 801 of the AUV 800. The AUV 800 performs the underwater cruising in a downward direction or a forward direction of the structure of the power transmitting coil CLA14, for example. If the position fixing hook 810 engages with the bar frame 1201 attached to the lower surface of the structure of the power transmitting coil CLA14, the AUV 800 stays, and can receive the power.

According to the fifth aspect, the power transmitting coil CLA14 can be located in a movement destination of the ship 50. Accordingly, in the power transmitting system 10, a charging place used by the power transmitting coil CLA14 and the power receiving coil CLB14 (alternatively, for example, the power receiving coil CLB of the AUV 800 illustrated in FIGS. 17A to 17C or the power receiving coil CLB1 illustrated in FIGS. 18A to 18C and 19A to 19C) can be installed in any desired place. In addition, the power transmitting coil CLA14 and the power receiving coil CLB14 are charged on the sea or near the sea surface. In this manner, a user of the power transmitting system 10 can carry out work while visibly recognizing the power transmitting coil CLA14 or the power receiving coil CLB14 from the ship.

Figure 25:
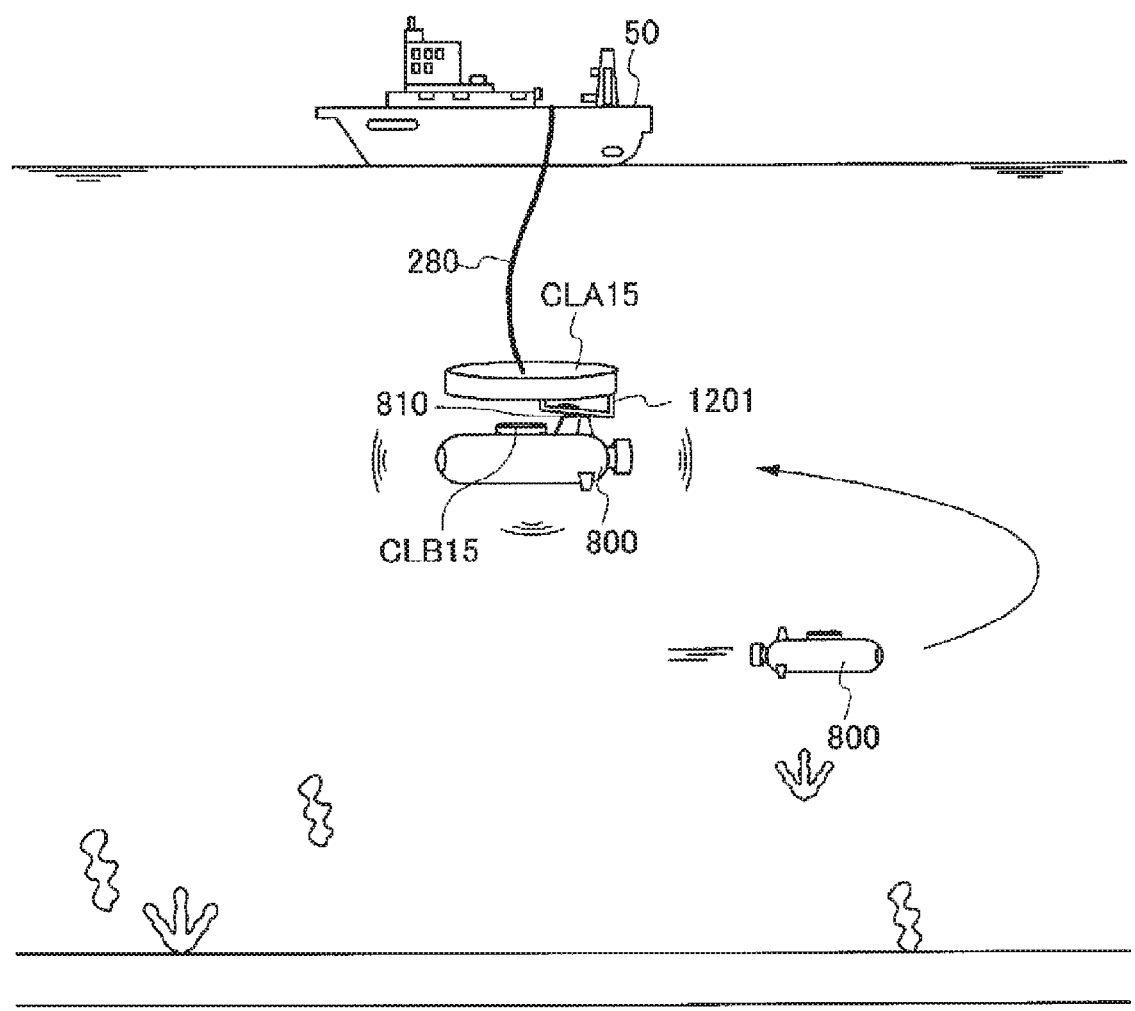
FIG. 25 is a diagram illustrating a sixth aspect of underwater power supply.

FIG. 25 is a diagram illustrating a sixth aspect of the underwater power supply. In the sixth aspect, a structure of a power transmitting coil CLA15 floats in the sea. The power cable 280 extending from the ship 50 moored on the sea is connected to the power transmitting coil CLA15. The structure of the power transmitting coil CLA15 is supported in a floating state in the sea by the power cable 280, and the power is supplied thereto via the power cable 280. In addition, the U-shaped bar frame 1201 is attached to the lower surface of the structure of the power transmitting coil CLA15.

The power receiving coil CLB15 and the position fixing hook 810 are attached to the body part 801 of the AUV 800. The AUV 800 performs the underwater cruising in the downward direction or the forward direction of the structure of the power transmitting coil CLA15, for example. If the position fixing hook 810 engages with the U-shaped bar frame 1201 attached to the lower surface of the structure of the power transmitting coil CLA15, the AUV 800 stays, and can receive the power.

According to the sixth aspect, the power transmitting coil CLA15 can be located in a movement destination of the ship 50. Accordingly, in the power transmitting system 10, a charging place used by the power transmitting coil CLA15 and the power receiving coil CLB15 (alternatively, for example, the power receiving coil CLB of the AUV 800 illustrated in FIGS. 17A to 17C or the power receiving coil CLB1 illustrated in FIGS. 18A to 18C and 19A to 19C) can be installed in any desired place. In addition, the power transmitting coil CLA15 and the power receiving coil CLB15 can be charged in the sea. Accordingly, compared to charging on the sea or near the sea surface, the vertical movement of the sea surface is less affected by waves, and a positional relationship is stabilized between the power transmitting coil CLA15 and the power receiving coil CLB15 in the sea. Accordingly, the power transmitting system 10 can prevent misalignment between the power transmitting coil CLA15 and the power receiving coil CLB15, and can perform highly efficient charging.

If the above-described embodiments are summarized, the power transmitting device 100 transmits the power to the power receiving device 200 having the power receiving coil CLB in the water (including the seawater). The power transmitting device 100 includes one or more annular coils CL (example of the transmitting coil) including the power transmitting coil CLA which transmits the power to the power receiving coil CLB via the magnetic field, the bobbin bn (example of the support member) located in the inner space of the coil CL formed by the annular coil CL, having the outer periphery along the inner periphery of the annular coil CL, and supporting the coil CL from the inside, the power transmitting circuit 150 (example of the power transmitting unit) which transmits the A/C power to the power transmitting coil CLA, and the capacitor CA connected to the coil CL and forming the resonance circuit 152 resonating together with the coil CL.

In this manner, even if there is the water currents (for example, the tidal currents) in the water (for example, in the sea), the power transmitting device 100 can prevent a portion of the coil CL from being deformed inward by the bobbin bn. Therefore, the power transmitting device 100 can prevent other portions of the coil CL from being deformed outward by preventing the coil CL from being deformed inward. Accordingly, the power transmitting device 100 can maintain a shape of the coil CL formed in accordance with a user's intention. The power transmitting device 100 can maintain a constant magnetic field generated by the coil CL by maintaining the shape of the coil, and can stabilize the transmitting efficiency using the plurality of coils CL. In this way, the power transmitting device 100 can prevent the deformation of the coil CL. In addition, the power transmitting device 100 can prevent a decrease in the transmitting efficiency by preventing loop-shaped deformation of the coil CL, when wireless power supply is performed.

The bobbin bn may be formed of a non-conductive material or a non-magnetic material.

In this manner, the power transmitting device 100 can prevent the current or the magnetic field generated in the coil CL from being transmitted outward of a power transmitting route (power transmitting route from the power transmitting coil CLA to the power receiving coil CLB) in the water via the bobbin bn. Accordingly, the power transmitting device 100 can prevent a decrease in the transmitting efficiency in the power transmitting using the plurality of the coils CL.

The bobbin bn10 may be annularly formed using a non-magnetic metal m10 (example of a conductor) formed in a C-shape in the circumferential direction, and an insulating material In10 formed in at least one location in the circumferential direction. In this way, at least a portion of the bobbin bn10 may have the non-magnetic metal m10, and the non-magnetic metal m10 may be insulated in the circumferential direction of the bobbin bn10.

In this manner, the power transmitting device 100 can prevent the current from flowing in the circumferential direction of the bobbin, even if a portion of the bobbin bn10 is conductive. Accordingly, the power transmitting device 100 can use a metal material for a portion of the bobbin bn10.

In addition, the power transmitting device 100 may include the relay box 300 (example of the relay member). The relay box 300 may include the housing 301 having the opening 302, internally equipped with the electric components including the capacitor 305, and the waterproof connector 303 disposed in the opening 302 to face outward of the housing 301, and surrounding the coil CL in the circumferential direction which passes through the opening 302. Inside the housing 301, the starting end T1 (example of one end) and the terminal T2 (example of the other end) of the coil CL may be electrically connected to each other. That is, one end of the coil CL passing through the inside of the waterproof connector 303 and the other end of the coil CL passing through the inside of the waterproof connector 303 may be connected to each other inside the relay box 300. In this manner, the coil CL and the capacitor CA may form the resonance circuit 152.

In this manner, the power transmitting device 100 can use the waterproof connector 303 to prevent the water from entering the inside of the relay box 300 from a connector portion of the relay box 300. Accordingly, the power transmitting device 100 can prevent an electrical short in the electric component in the relay box 300.

In addition, the relay box 300 may be internally filled with the oil.

Since the oil is not mixed with the water, the relay box 300 is internally filled with the oil. In this manner, the power transmitting device 100 can prevent the water from entering the inside of the relay box 300. In addition, since the oil has lower conductivity than the water, it is possible to prevent the current flowing through the coil from leaking outward of the coil CL. That is, the power transmitting device 100 can prevent a decrease in the current flowing through the coil CL, and can prevent a decrease in the magnetic field generated by the coil CL. Accordingly, it is possible to prevent a decrease in the transmitting efficiency.

The power transmitting device 100 may include the spacer 350. The spacer 350 may include the spacer 350-1 (example of the first spacer) and the spacer 350-2 (example of the second spacer). The spacer 350-1 may pinch the bobbin bn1 and the power transmitting coil CLA (example of the first transmitting coil) wound along the outer periphery of the bobbin bn1. The spacer 350-2 may pinch the bobbin bn2 (example of the second support member) and the relay coil CLC-1 (example of the second transmitting coil) wound along the outer periphery of the bobbin bn2. The spacer 350-1 may be connected to the spacer 350-2 via the coil connection rope 453 (example of the connection member having a predetermined length).

In this manner, the power transmitting device 100 pinches the bobbin bn and the coil CL by using the spacer 350. Accordingly, the wound coil CL can be positioned within a width of the outer surface which receives the coil CL of the bobbin bn. In addition, in a case where the coil CL is deployed in the water, a constant distance between the respective coils CL (the distance in the transmitting direction) can be maintained, and a constant magnitude of the power transmitted between the respective coils CL can be maintained.

The spacer 350 may include the first member 351 having the first surface parallel to the outer periphery of the bobbin bn, the second member 352 having the second surface perpendicular to the first surface, and the third member 353 having the third surface parallel to the second surface. The second member 352 and the third member 353 may pinch the bobbin bn and the coil CL wound along the outer periphery of the bobbin bn. The second member 352 and the third member 353 may have the through-holes 354a, 354b, 355a, and 355b into which the coil connection rope 452 and 453 are respectively inserted to be connected to the other spacer 350 pinching the other bobbin bn.

In this way, the power transmitting device 100 pinches the bobbin bn and the coil CL by using the spacer 350. Accordingly, the wound coil CL can be positioned within the width of the outer surface which receives the coil CL of the bobbin bn. In addition, the coil connection ropes 452 and 453 are attached by being inserted into the through-holes 354a, 354b, 355a, and 355b. In this manner, in a case where the coil CL is deployed in the water, the constant distance between the respective coils CL (distance in the transmitting direction) can be maintained, and the constant magnitude of the power transmitted between the respective coils CL can be maintained.

The second member 352 may have the projection portion 361 projecting on a side opposite to a location side of the third member 353. The third member 353 may have the recess portion 362 recessed to a location side of the second member 352.

In this manner, in the power transmitting device 100, the projection portion 361 and the recess portion 362 engage (for example, fit to) with each other when the plurality of coils CL are connected or when transported after the connection. In this manner, the respective spacers 350 pinching the respective coils CL can be connected. In addition, the power transmitting device 100 can minimize a region required for the plurality of coils CL (volume occupied by the plurality of coils CL), and can have a compact size. Therefore, the power transmitting device 100 including the coil CL can be easily transported to a predetermined place.

The power transmitting device 100 may include the first support plate 701 and the second support plate 703. The coils CL may be arranged on the same plane, and may be spirally wound multiple times. The coil CL may be pinched between the first support plate 701 and the second support plate 703. The first support plate 701 may have the rib (example of the support member) along the innermost periphery of the spirally wound coil CL.

In this manner, even in a case where the coil CL is spirally wound, the power transmitting device 100 can prevent a portion in the innermost periphety of the coil CL from being deformed inward, and can prevent the deformation of the overall wound coil CL. In addition, the power transmitting device 100 can protect the coil CL from external pressure in the up-down direction by using the first support plate 701 and the second support plate 703.

In addition, the relay box 300 may be located on a side opposite to a location side of the coil CL, in the first support plate 701. The first support plate 701 may have the through-holes 701y and 701x into which the coil CL extending toward the relay box 300 is inserted.

In this manner, even in a case where the coil CL is spirally wound, the power transmitting device 100 can connect the starting end and the terminal of the coil CL to each other through the through-holes 701y and 701x inside the relay box 300. Therefore, the coil CL can form the resonance circuit 152 together with the capacitor inside the relay box 300, and the power can be transmitted.

In addition, the bobbin bn11 may be formed in a cylindrical shape. The plurality of coils CL may be wound along the outer periphery of the same bobbin bn11.

In this manner, the power transmitting device 100 can support the plurality of coils CL from the inside by using one bobbin bn1. The power receiving device 200 having the power receiving coil CLB can receive the power transmitted from the coil CL by entering the inside of the cylindrical bobbin bn11.

Hitherto, the embodiments have been described with reference to the drawings. However, the present disclosure is not limited to the examples, as a matter of course. It will be apparent to those skilled in the art that various modification examples or correction examples can be adopted within the scope of the appended claims. As a matter of course, it will be understood that these are included within the technical scope of the present disclosure.

In the above-described embodiment, an example has been described in which the power transmitting device 100 includes the bobbin bn, the relay box 300, the spacer 350, the coil deployment rope 451, and the coil connection rope 452. The bobbin bn, the relay box 300, the spacer 350, the coil deployment rope 451, and the coil connection rope 452 may be disposed in the power transmitting system 10, separately from the power transmitting device 100.

In the above-described embodiment, for example, as illustrated in FIG. 3, an example has been mainly described in which the power transmitting coil CLA is located in the end of the coil in a plurality of stages (for example, the multistage coil). Without being limited thereto, the power transmitting coil CLA may be located in the central portion of the coil CL in the plurality of stages. For example, in a case where the positions of the power transmitting coil CLA and the relay coil CLC-1 illustrated in FIG. 3 are switched therebetween, the magnetic field generated around the power transmitting coil CLA in the central portion is transmitted to the relay coils CLC1-1 and CLC1-2 and the power receiving coil CLB in the up-down direction in FIG. 3.

In the above-described embodiment, the processor may be configured in any physical manner. In addition, if a programmable processor is used, processing contents can be changed by changing a program. Accordingly, the processor can be more freely designed. The processor may be configured to include one semiconductor chip, or may be configured to physically include a plurality of semiconductor chips. In a case where the processor is configured to include the plurality of semiconductor chips, each control in the above-described embodiment may be realized by each separate semiconductor chip. In this case, it is conceivable that one processor is configured to include the plurality of semiconductor chips. In addition, the processor may be configured to include a member having a function different from that of the semiconductor chip (such as a capacitor). In addition, one semiconductor chip may be configured to realize a function belonging to the processor and other functions. In addition, the plurality of processors may be configured to serve as one processor.

The present disclosure has been described in detail and with reference to specific embodiments. However, it will be apparent to those skilled in the art that various modifications or corrections can be added without departing from the gist and scope of the present disclosure.

The present application is based on Japanese Patent Application No. 2017-094100, filed on May 10, 2017, the contents of which are incorporated herein by reference.

INDUSTRIAL APPLICABILITY

The present disclosure is usefully applicable to a power transmitting device which can prevent deformation of an annular transmitting coil, and which can prevent a decrease in transmitting efficiency during contactless power transmitting in water.

REFERENCE SIGNS LIST

10: power transmitting system
20: cable
50: ship
60: underwater vehicle
70: submarine
80: underwater excavator
90: water surface
95: water bottom
100: power transmitting device
110: power supply
120: ADC
130: CPU
140: information communication unit
141: modulation/demodulation circuit
150: power transmitting circuit
151: driver
152: resonance circuit
200: power receiving device
210: power receiving circuit
211: rectifier circuit
212: regulator
220: CPU
230: charge control circuit
240: secondary battery
250: information communication unit
251: modulation/demodulation circuit
280, 280A: power cable
300, 300A, 580: relay box
301: housing
301$y$: lid
301$z$: frame
302: opening
303: waterproof connector
304: terminal connection portion
305: capacitor
306: relay circuit
307: control circuit
350, 350-1, 350-2, 350-3, 550: spacer
351: first member
352: second member
353: third member
351$z$: first surface
352$z$: second surface
353$z$: third surface
354$a$, 354$b$, 355$a$, 355$b$, 361$a$, 362$a$: through-hole
361: projection portion
362: recess portion
410, 510: binding band
451: coil deployment rope
452, 453: coil connection rope
701: first support plate
701$x$, 701$y$: through-hole
701$z$, 703$z$: opening
703: second support plate
800: AUV
801: body part
802, 803: wing part
805: screw part
810: position fixing hook
910: sea bottom
910$z$: slope
920, 930: base frame
920$z$, 930$z$, 1201: bar frame
930$y$: lateral plate
1000, 1000A, 1000B. 1000C, 1000D, 1000E: power supply stand
1101, 1105, 1106: column
bn, bn1, bn2, bn3, bn5, bn10, bn11, bn13, bn14, bn15, bn31: bobbin
CLA, CLA1, CLA2, CLA3, CLA13, CLA14, CLA15: power transmitting coil
CLB, CLB1: power receiving coil
CLC, CLC-1, CLC-2, CLC1. CLC1-1, CLC1-2, CLC2-1, CLC2-2, CLC3-1. CLC3-2, CLC13: relay coil
CA, CB, CC: capacitor
CL: coil
En1, En2. En3: disc
In10: insulating material
L11, L12, L13, L14, L21, L22, L23, L24: connection member
m10: non-magnetic metal

The invention claimed is:

1. A power transmitting device that transmits power to a power receiving device having a power receiving coil in water, the power transmitting device comprising:
one or more annular transmitting coils, including an annular power transmitting coil configured to transmit the power to the power receiving coil via a magnetic field;
an annular support member located in an inner space of the annular power transmitting coil,
the inner space being formed by the annular power transmitting coil, the annular support member including an outer periphery along an inner periphery of the annular power transmitting coil, and supporting the annular power transmitting coil from the inner space of the annular power transmitting coil;

a power transmitter configured to supply A/C power to the annular power transmitting coil;

a capacitor connected to the transmitting coil, and forming a resonance circuit resonating together with the transmitting coil; and one or more spacers connected to an inside portion of the annular support member.

2. The power transmitting device according to claim 1, further comprising:

a relay member, wherein the relay member includes a housing having an opening, and internally equipped with an electric component including the capacitor, and a waterproof connector disposed in the opening to face outward of the housing, and surrounding a circumferential direction of the transmitting coil passing through the opening, wherein a first end and a second end of the annular power transmitting coil are electrically connected to each other inside the housing.

3. The power transmitting device according to claim 2, wherein the relay member is internally filled with oil.

4. The power transmitting device according to claim 1, wherein the annular support member is formed of a non-conductive material or a non-magnetic material.

5. The power transmitting device according to claim 1, wherein at least a portion of the annular support member has a conductor, and the conductor is insulated in a circumferential direction of the annular support member.

6. The power transmitting device according to claim 1, wherein a plurality of annular support members are formed in a cylindrical shape, and a plurality of annular power transmitting coils are wound along an outer periphery of a same annular support member.

7. The power transmitting device according to claim 1, wherein the one or more spacers includes a first spacer and a second spacer.

8. The power transmitting device according to claim 7, wherein the annular support member includes a first annular support member and a second annular support member.

9. The power transmitting device according to claim 8, wherein the annular power transmitting coil includes a first annual power transmitting coil and a second annular power transmitting coil.

10. The power transmitting device according to claim 9, wherein the first spacer pinches the first annular support member and the first annular power transmitting coil wound along an outer periphery of the first annular support member.

11. The power transmitting device according to claim 10, wherein the second spacer pinches the second annular support member and the second annular power transmitting coil wound along an outer periphery of the second annular support member.

12. The power transmitting device according to claim 11, wherein the first spacer is connected to the second spacer via a connection member having a predetermined length.

13. The power transmitting device according to claim 7, wherein the first spacer is connected to the second spacer via a connection member having a predetermined length.

14. The power transmitting device according to claim 8, wherein each spacer includes a first spacer member, the first spacer member having a first surface parallel to an outer periphery of the first annular support member, a second spacer member having a second surface perpendicular to the first surface, and a third spacer member having a third surface parallel to the second surface, and the second spacer member and the third spacer member pinch the first annular support member and the first annular power transmitting coil wound along the outer periphery of the first annular support member, and have a through-hole into which a connection member for connecting the second spacer pinching the second annular support member is inserted.

15. The power transmitting device according to claim 14, wherein the second spacer member includes a projection portion projecting to a side opposite to a location side of the third spacer member, and the third spacer member includes a recess portion recessed to a location side of the second spacer member.

16. The power transmitting device according to claim 14, wherein the first spacer and the second spacer each has a U-shape as a whole.

* * * * *